(12) United States Patent
Suzumura et al.

(10) Patent No.: US 7,100,416 B2
(45) Date of Patent: Sep. 5, 2006

(54) CARRIER AND METHOD OF MANUFACTURING CARRIER

(75) Inventors: Takashi Suzumura, Toyota (JP); Keiichi Matsunaga, Anjo (JP)

(73) Assignees: Toyota Jidosha Kabushiki Kaisha, Toyota (JP); MEG Inc., Anjo (JP)

( * ) Notice: Subject to any disclaimer, the term of this patent is extended or adjusted under 35 U.S.C. 154(b) by 181 days.

(21) Appl. No.: 10/689,613

(22) Filed: Oct. 22, 2003

(65) Prior Publication Data

US 2004/0082432 A1 Apr. 29, 2004

Related U.S. Application Data

(62) Division of application No. 09/783,992, filed on Feb. 16, 2001, now abandoned.

(30) Foreign Application Priority Data

| Feb. 16, 2000 | (JP) | ............................. 2000-038561 |
| Nov. 30, 2000 | (JP) | ............................. 2000-365175 |

(51) Int. Cl.
    *B21D 53/00* (2006.01)
(52) U.S. Cl. ................................ 72/379.2; 29/894.362
(58) Field of Classification Search ............... 72/353.4, 72/370.08, 379.2; 29/894.362, 898.066
    See application file for complete search history.

(56) References Cited

U.S. PATENT DOCUMENTS

| 1,931,163 | A | * | 10/1933 | Kranz et al. ............ 29/894.362 |
| 2,123,842 | A | * | 7/1938 | Cox .............................. 72/339 |
| 2,684,103 | A | * | 7/1954 | Lee et al. ................... 72/353.4 |
| 3,046,064 | A | * | 7/1962 | Schaeffler .................... 384/572 |
| 3,842,481 | A | | 10/1974 | Laing |
| 4,043,021 | A | | 8/1977 | Mosbacher et al. |
| 4,129,050 | A | | 12/1978 | Akashi et al. |
| 5,292,292 | A | | 3/1994 | Heinrich et al. |
| 5,470,286 | A | | 11/1995 | Fan |
| 5,658,215 | A | | 8/1997 | Premiski et al. |
| 6,347,900 | B1 | * | 2/2002 | Sadakata et al. .............. 403/74 |
| 6,371,571 | B1 | | 4/2002 | Tsan |
| 6,428,112 | B1 | | 8/2002 | Passoth et al. |

FOREIGN PATENT DOCUMENTS

| DE | 26 05 230 B1 | 7/1977 |
| EP | 0 271 416 A1 | 6/1988 |
| GB | 1 573 175 | 8/1980 |
| JP | 50-86469 | 7/1975 |
| JP | 57-72728 A | 5/1982 |
| JP | 58-156773 A | 9/1983 |
| JP | 59-126136 A | 7/1984 |
| JP | 60-46819 A | 3/1985 |
| JP | 1-122618 A | 5/1989 |
| JP | 2-81949 U | 6/1990 |
| JP | 7-133848 A | 5/1995 |
| JP | 7-269568 A | 10/1995 |
| JP | 10-288248 A | 10/1998 |

* cited by examiner

*Primary Examiner*—Lowell A. Larson
(74) *Attorney, Agent, or Firm*—Buchanan Ingersoll PC

(57) ABSTRACT

A carrier C is integrally formed of a pair of flanges opposed to each other and designed to rotatably support rotating bodies therebetween and a plurality of joints for connecting the flanges. A groove is formed on the border between the flanges and the joints, and openings are made among the joints. Engagement holes for rotatably supporting rotational shafts of rotating bodies are made in the flanges.

41 Claims, 24 Drawing Sheets

F I G. 34A
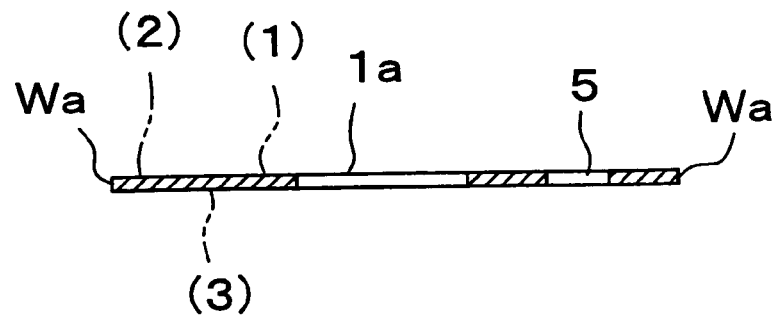
F I G. 34B
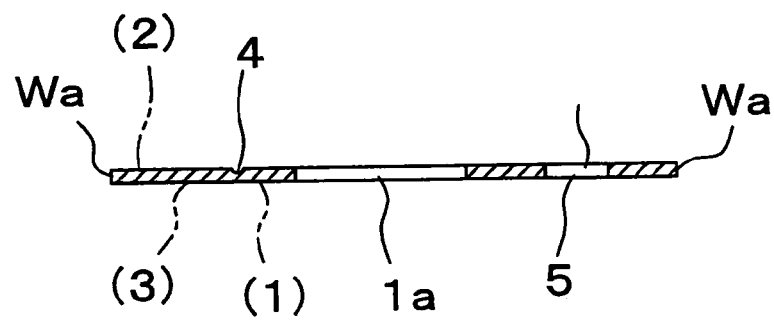
F I G. 34C
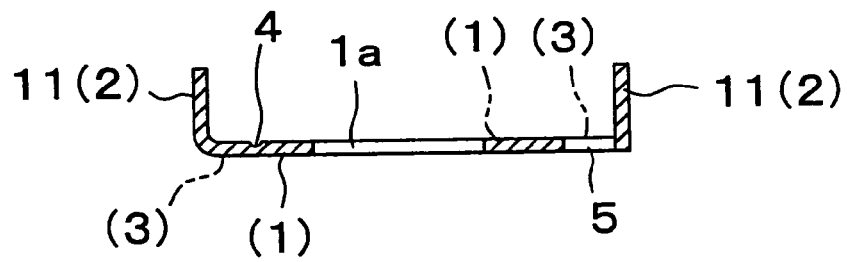
F I G. 34D
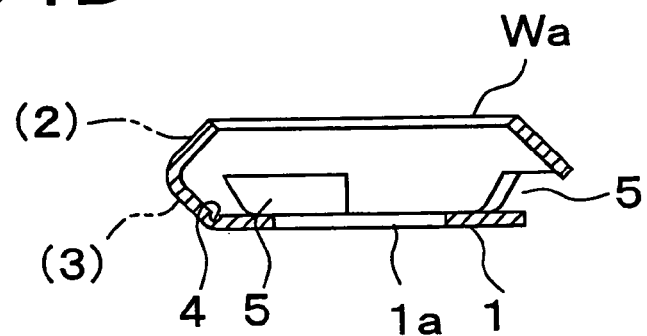

CARRIER AND METHOD OF MANUFACTURING CARRIER

This application is a divisional of U.S. application Ser. No. 09/783,992 filed on Feb. 16, 2001, now abandoned.

INCORPORATION BY REFERENCE

The disclosures of Japanese Patent Application Nos. 2000-38561 filed on Feb. 16, 2000 and 2000-365175 filed on Nov. 30, 2000 including the specifications, drawings and abstracts are incorporated herein by reference in their entirety.

BACKGROUND OF THE INVENTION

1. Field of the Invention

The invention relates to a carrier and a method of manufacturing the carrier and, more particularly, to a carrier for rotatably supporting rotating bodies such as gears and pulleys and a method of manufacturing the carrier.

2. Description of Related Art

A planetary gear unit is generally employed in an automatic transmission of an automobile. The planetary gear unit has a sun gear, a ring gear disposed around the sun gear, a planetary gear or a pinion (hereinafter referred to generically as a planetary gear) disposed between the sun gear and the ring gear so as to engage them, and a carrier for rotatably supporting the planetary gear.

As an example of a carrier for supporting a planetary gear or the like of a planetary gear unit, Japanese Patent Application Laid-Open No. HEI 10-288248 discloses a planetary gear unit for an automatic transmission according to the related art of the invention. This planetary gear unit has a ring gear, a sun gear and a pinion that engage one another, and a carrier for rotatably supporting the pinion. The carrier is composed of a boss connected to a shaft of the automatic transmission, a radially extended plate, a carrier plate formed of a salient axially protruding from the radially extended plate, and a base plate having holes into which the salient of the carrier plate is fitted. The salient of the carrier plate is made thicker than the boss and the radially extended plate by differential-thickness press working.

In the planetary gear unit disclosed in the aforementioned publication, as shown in FIG. 39, a carrier C' is composed of a carrier plate 31 spline-connected to a shaft of an automatic transmission and a disc-shaped base plate 32. The carrier plate 31 is composed of a disc-shaped plate 31a and a plurality of columns (salients) 33 protruding towards the base plate 32 from the outer periphery of the plate 31a in a direction substantially parallel to the shaft. Fitting portions 33a with a reduced thickness are formed at the ends of the columns 33. The base plate 32 is constructed of an annular sheet material having at its center a through-hole 32a through which a shaft (not shown) or a sun gear (not shown) is inserted. Fitting holes 32b, into which the fitting portions 33a formed at the ends of the columns 33 of the carrier plate 31 are fitted, are formed on the outer circumferential side of the base plate 32. The carrier plate 31 and the base plate 32 are connected by fitting the fitting portions 33a formed at the ends of the columns 33 into the fitting holes 32b and welding parts of the fitting portions 33a fitted into the fitting holes 32b to the base plate 32. That is, according to this carrier, the carrier plate 31 and the base plate 32 are formed individually, assembled, welded, and then integrated. The carrier plate 31 and the base plate 32 are obtained from press-worked sheet materials. The aforementioned publication also discloses that the carrier plate and the base plate can be formed by forging or forging+cutting and the like instead of press working. In such a carrier, the pinion is inserted into the carrier among the columns 33 and between the carrier plate 31 and the base plate 32, and openings 35 defining a space for engagement of tooth tops of the pinion gear with the ring gear are made.

According to another related art, the base plate 32 and the carrier plate 31 having the columns 33 as in the carrier of the aforementioned related art are formed by sintering, assembled, connected by waxing instead of welding, and then integrated into a carrier.

In addition, according to still another related art, the carrier plate 31, the base plate 32 and the columns 33 are cast and integrated into a carrier. In this related art, in order to ensure that opposed faces of the carrier plate 31 and the base plate 32 are parallel to each other, the carrier plate 31 and the base plate 32 are cut after the carrier has been formed integrally. However, among the aforementioned related arts, as for the carrier disclosed in Japanese Patent Application Laid-Open No. HEI 10-288248, as described above, every time a carrier is manufactured, the carrier plate 31 and the base plate 32 that have been formed individually need to be assembled, connected by welding or waxing, and then integrated. For this reason, the number of manufacturing processes is great and each process requires its own plant, which causes a problem of the inability to reduce the cost.

Furthermore, for the purpose of rotatably supporting rotating bodies, the carrier is required to guarantee a high degree of parallel precision of the opposed faces of the carrier plate 31 and the base plate 32. However, among the aforementioned related arts, as for the art wherein the carrier plate 31 and the base plate 32 that have been formed individually by press working or sintering are assembled by welding or waxing, the parallel precision of the opposed faces cannot be enhanced due to an error caused during an assembling operation, a tolerance of pressing during the manufacture of the carrier plate 31 and the base plate 32, a distortion caused during sintering, welding heat at the time of connection, or a distortion caused by waxing. In order to solve this problem, it can be considered to dispose a mandrel having a predetermined width between the opposed faces of the carrier plate 31 and the base plate 32 after the carrier plate 31 and the base plate 32 have been integrated, and swage them towards the mandrel. However, in the aforementioned related art, since a welded portion or a waxed portion for connecting the carrier plate 31 and the base plate 32 cracks, it is impossible to perform swaging.

Further, among the aforementioned related arts, in the case where the carrier plate 31 and the base plate 32 that have been formed individually are assembled by welding, since it is necessary to prevent the fitting portions 33a of the columns 33 and the base plate 32 having the fitting holes 32b from being melted down during welding and guarantee sufficient rigidity, it is impossible to thin at least the base plate 32 and the columns 33 or narrow the peripheries of the columns 33. This makes it impossible to save the weight of the carrier.

In addition, in the case where the columns 33 of the carrier plate 31 and the base plate 32, which have been pressed, are assembled by welding, since the carrier plate 31 and the base plate 32 have been formed individually, the interrupted flow of a material causes a problem of low rigidity. In the case where the columns 33 of the carrier plate 31 and the base plate 32, which have been formed by sintering, are assembled by welding, since powder materials with a low density are used and there is no material flow, there is caused a problem of much lower rigidity.

Among the aforementioned related arts, as for the carrier into which the carrier plate, the base plate and the joints are cast and integrated, it is necessary to cut the carrier plate and the base plate after the carrier has been formed integrally. For this reason, the number of manufacturing processes increases and materials are wasted, which causes a problem of an increase of the cost. Because the carrier that has been formed by casting is obtained simply by forming a molten material and a density of contents of the carrier is low and there is no material flow, there is caused a problem of even lower rigidity.

Because of the problem of low rigidity as described above, namely, the problem of low rigidity per unit weight, the carrier that has been manufactured by sintering or forging needs to be made thick so as to guarantee predetermined rigidity. This causes problems of more wasted materials and the inability to save the weight of the carrier.

SUMMARY OF THE INVENTION

The invention has been made in consideration of the aforementioned problems. It is an object of the invention to provide a carrier having a construction capable of enhancing parallel precision of opposed faces with a reduced number of processes and saving the weight through increased rigidity. It is also an object of the invention to provide a carrier having a construction that makes its manufacture easy.

Furthermore, with a view to solving the aforementioned problems, it is also an object of the invention to provide a method of manufacturing a carrier wherein the number of manufacturing processes can be reduced with a simple structure, wherein the parallel precision of opposed faces can be enhanced easily, and wherein the weight can be saved through increased rigidity.

In order to achieve the aforementioned objects, there is provided a carrier according to a first aspect of the invention wherein a pair of flanges opposed to each other and designed to rotatably support rotating bodies therebetween and joints for connecting the flanges are integrally formed through plastic deformation of a single material.

In the carrier according to the first aspect of the invention, the flanges and the joints are integrally formed through plastic deformation of a single material with uninterrupted flow of the material. Therefore, the number of parts is reduced and the processes of assembling and bonding become unnecessary so that the carrier is formed with a reduced-number of processes. Thus, the parallel precision of the opposed faces is enhanced at a low cost, and the weight can be saved through high rigidity.

The joints may be disposed along outer peripheries of the flanges.

Because the joints are disposed along the outer peripheries of the flanges, there is provided a carrier suited to support, as rotating bodies that are rotatably supported, planetary gears engaging sun gears in an automatic transmission. In this case, a plurality of joints are disposed along the circumference of the flanges discontinuously, and openings are made among the joints. Holes through which shafts for supporting the sun gears are inserted are formed at the centers of the flanges.

Furthermore, a groove may be formed on a border between the flanges and the joints.

If the groove is formed on the border between the flanges and the joints especially on the side of the inner surface of the carrier, the process of bending is guided by the groove and the border between the flanges and the joints is formed with high precision. Therefore, an integral-type carrier having a construction that makes its manufacture easy is provided.

In a method of manufacturing a carrier according to another aspect of the invention, a material is formed into the shape of a cup having an opening, and the opening of the cup is closed off so that a pair of flanges opposed to each other and designed to rotatably support rotating bodies therebetween and joints for connecting the flanges are integrally formed.

According to this aspect of the invention, after the material has been formed into the shape of a cup, the material is closed off so that the end faces of the opening in the cup are shrunk radially inwardly. Thereby it becomes easy to manufacture a carrier having a pair of flanges opposed to each other and designed to rotatably support rotating bodies therebetween and joints for connecting the flanges. Besides, since the flanges and the joints are integrally formed from a single material with uninterrupted flow of the material, the number of parts is reduced and the processes of assembling and bonding become unnecessary so that the carrier is formed with a reduced number of processes. Thus, there is provided a method of manufacturing a carrier wherein the parallel precision of opposed faces can be enhanced at a low cost and wherein the weight can be saved through high rigidity. A bottom of the material formed into the shape of the cup is turned into one of the flanges. Peripheral walls adjacent to the bottom are turned into the joints. An opening-side portion of the cup-shaped material, which is to be closed off, is turned into the other flange. Thus, according to the invention, a carrier of a configuration wherein joints are integrated with the outer peripheries of flanges is manufactured.

The material is selected from a plate material, a rod material and a tubular material.

By selecting one of a plate material, a rod material and a tubular material, a method of manufacturing a carrier easily is provided in a more concrete form. In the case where a plate material is used, the material can be formed into the shape of a cup by being bent and/or drawn. In the case where a tubular material is used, the material can be formed into the shape of a cup by shrinking one end of the material. In the case where a rod material is used, the material can be formed into the shape of a cup by being extruded.

In a method of manufacturing a carrier according to another aspect of the invention, both end openings of a tubular material are closed off, whereby a pair of flanges opposed to each other and designed to rotatably support rotating bodies therebetween and joints for connecting the flanges are formed integrally.

According to this aspect of the invention, both end faces of openings of a tubular material are simultaneously closed off so that they are shrunk radially inwardly. Thereby a carrier having a pair of flanges opposed to each other and designed to rotatably support rotating bodies therebetween and joints for connecting the flanges is manufactured easily. Besides, since the flanges and the joints are integrally formed from a single material with uninterrupted flow of the material, the number of parts is reduced and the processes of assembling and bonding become unnecessary so that the carrier can be formed with a reduced number of processes. Thus, there is provided a method of manufacturing a carrier wherein the parallel precision of opposed faces can be enhanced at a low cost and wherein the weight can be saved through high rigidity. Axial centers of a side wall of the tubular material are turned into the joints of the carrier, and both axial ends of the side wall of the tubular material, which are to be closed off, are turned into a pair of flanges. Thus, according to the invention, a carrier having a configuration wherein joints are integrated with the outer peripheries of flanges is manufactured.

A bending guide such as a groove may be formed on a border between pre-joints and the other pre-flange before the material is closed off.

By forming the bending guide, the process of bending is guided by the guide precisely when the material is closed off. Therefore, the parallel precision and the dimensional precision of the opposed faces of the flanges are further enhanced.

Openings may be made in pre-joints of the material before the material is closed off.

If the openings are made, the outer peripheral faces of the flanges are curved towards the inside of the openings when the material is closed off. That is, the openings are made in the joints without affecting the parallel precision of the opposed faces of the flanges. Therefore the parallel precision of the opposed faces is further enhanced. In the case where a plate material is used, the openings are made by forming the contour of the material and trimming it at the same time. Thus, the number of processes can be further reduced.

In addition, mandrels may be inserted from the openings made in the pre-joints of the material so as to close off the material.

The material is closed off with the mandrels inserted into the pre-joints of the material from the openings that have been made, whereby it becomes possible to close off the material from its precise position and further enhance the parallel precision and the dimensional precision of the opposed faces of the flanges.

Engagement holes for engagement with rotational shafts for rotatably supporting rotating bodies in the carrier may be made in pre-flanges before the material is closed off.

If the engagement holes are made in advance in the pre-flanges of the material, the parallel precision of the opposed faces of the flanges is not affected by the pressing force or the like generated at the time when the engagement holes are made. Thus, the parallel precision of the opposed faces is further enhanced. In addition, if a plate material is used, the engagement holes are made by forming the contour of the material and trimming it at the same time. Thus, the number of processes can be further reduced.

In a method of manufacturing a carrier according to still another aspect of the invention, a wall surface at the axial center of the tubular material is bulged radially outwardly so that a pair of flanges opposed to each other and designed to rotatably support rotating bodies therebetween and joints for connecting the flanges are integrally formed.

According to this aspect of the invention, the center of a tubular material is bulged, whereby a carrier having a pair of flanges opposed to each other and rotatably supporting rotating bodies therebetween and joints for connecting the flanges is manufactured easily. Besides, since the flanges and the joints are integrally formed from a single material with uninterrupted flow of the material, the number of parts is reduced and the processes of assembling and bonding become unnecessary so that the carrier can be formed with a reduced number of processes. Thus, the parallel precision of the opposed faces can be enhanced at a low cost, and the weight can be saved through high rigidity. Bulged axial centers of the tubular material are turned into the joints of the carrier, and both axial ends of the tubular material are turned into a pair of flanges. Thus, according to this aspect of the invention, a carrier having a configuration wherein joints are integrated with the outer peripheries of the flanges is manufactured.

Openings may be made in pre-joints of the material before the material is bulged.

If the openings are made in the pre-joints at the centers of the tubular material before the tubular material is bulged, the outer peripheral end faces of the flanges are curved towards the inside of the openings when the material is bulged. That is, the openings are made in the joints without affecting the parallel precision of the opposed faces of the flanges. Thus, the parallel precision of the opposed faces can be further enhanced.

Engagement holes for engagement with rotational shafts for rotatably supporting rotating bodies in the carrier are made in pre-flanges before the material is bulged.

If the engagement holes are made in advance in the pre-flanges of the material, the parallel precision of the opposed faces of the flanges is not affected by the pressing force or the like generated at the time when the engagement holes are made. Thus, the parallel precision of the opposed faces can be further enhanced.

Furthermore, mandrels may be interposed in positions for mounting rotating bodies between the flanges so that the flanges are swaged towards the mandrels.

If the process of swaging is performed with the mandrels interposed in the positions for mounting rotating bodies between the flanges, there is provided a method of manufacturing a carrier wherein the parallel precision and the dimensional precision of opposed faces at positions for mounting rotating bodies between flanges can be further enhanced. In the case where openings are made in advance in portions of a material, which are turned into joints in one of the following processes, before the material is formed in a predetermined manner, mandrels can be inserted from the openings easily.

BRIEF DESCRIPTION OF THE DRAWINGS

FIG. 34 is a cross-sectional view of a method of manufacturing a carrier according to a fifth embodiment of the invention.

DETAILED DESCRIPTION OF PREFERRED EMBODIMENTS

Figure 1:
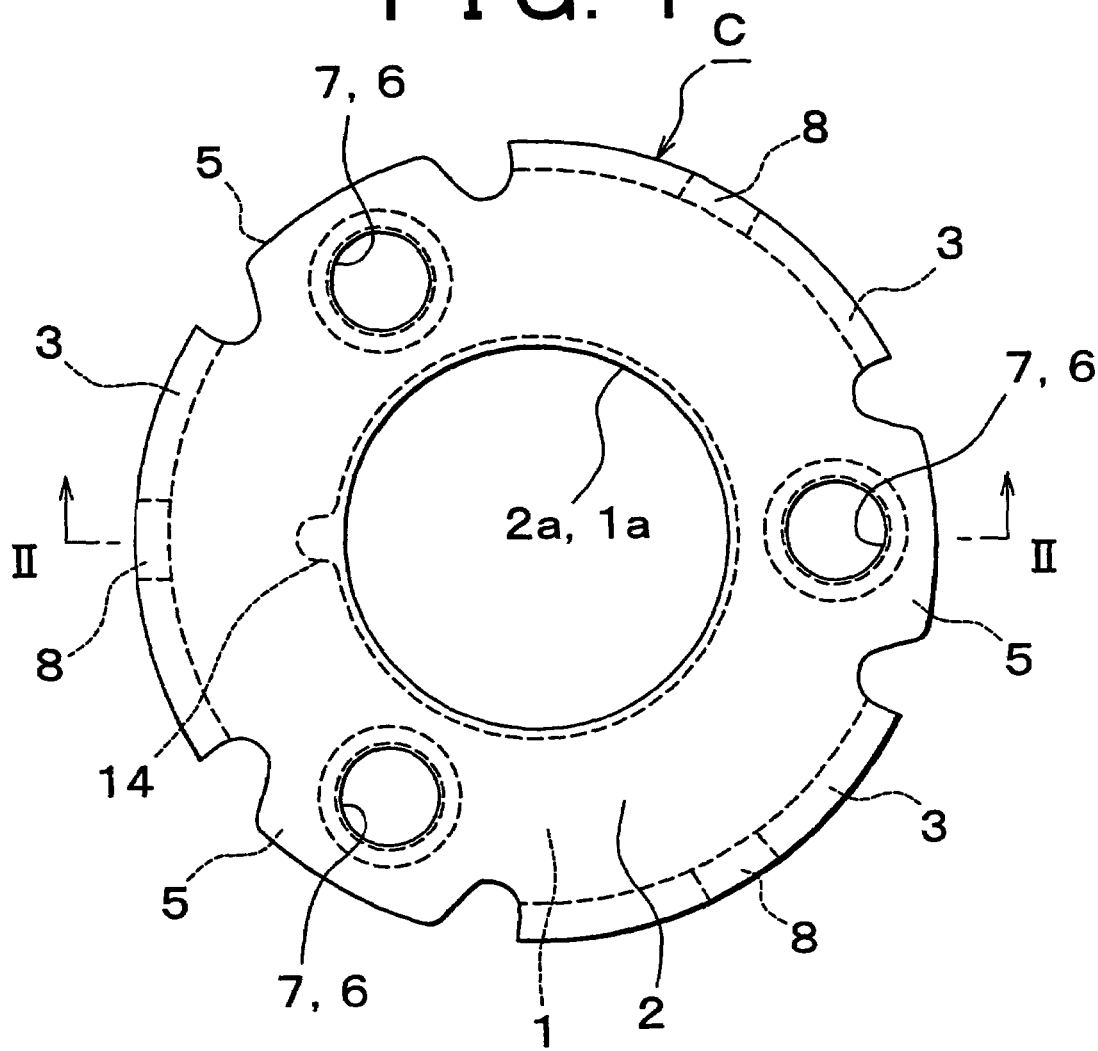
FIG. 1 is a plan view of a carrier according to one embodiment of the invention.

First of all, a carrier according to one embodiment of the invention will be described in detail with reference to FIGS. 1, 2, which show a carrier C for rotatably supporting planetary gears (not shown) as rotating bodies in a planetary gear unit of an automatic transmission employed in an automobile and the like as described above. In the following description, like reference numerals denote like or similar components.

The carrier C of the invention is integrally formed of a pair of flanges 1, 2 and a plurality of joints 3 through plastic deformation of a single material. The flanges 1, 2 are opposed to each other and rotatably support rotating bodies therebetween. The joints 3 connect both the flanges 1, 2. A groove 4 is formed on the border between the flanges 1, 2 and the joints 3. The carrier C has openings 5 for exposing planetary gears so that the planetary gears and the like are inserted into the carrier C among the joints 3 and that the planetary gears can engage ring gears (not shown). Engagement holes 6, 7 for rotatably supporting rotational shafts of rotating bodies are made in the flanges 1, 2 of the carrier C respectively.

Each of the flanges 1, 2, which constitute a pair, is formed generally in the shape of a disc. In this embodiment, through-holes 1a, 2a, through which shafts (not shown) and sun gears (not shown) are inserted, are made at the centers of the flanges 1, 2 respectively. The flanges 1, 2 of the invention function substantially in the same manner as the carrier plate 31 and the base plate 32 of the carrier C' of the aforementioned related art. A plurality of joints 3 are formed along outer peripheral edges of the flanges 1, 2 in the direction parallel to an axis J—J so as to retain opposed faces of the flanges 1, 2 at a predetermined distance. The joints 3 of the invention function substantially in the same manner as a plurality of columns 33 protruding towards the base plate 32 substantially in the direction parallel to the shafts from the outer periphery of the plate portion 3a of the carrier plate 31 of the carrier C' of the aforementioned related arts.

Figure 2:
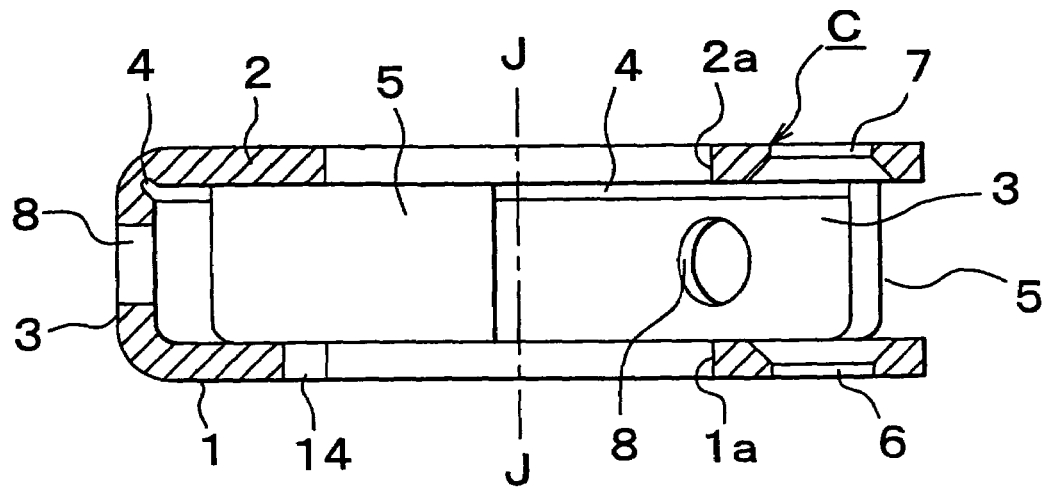
FIG. 2 is a cross-sectional view taken along a line II—II shown in FIG. 1.

In the embodiment shown in FIG. 1, the flanges 1, 2 respectively have the three engagement holes 6, 7 for engagement with rotational shafts (not shown) for rotatably supporting planetary gears. Thus, in this embodiment, the three joints 3 are disposed along the outer peripheral edges of the flanges 1, 2 substantially at the centers with respect to the circumferential direction of the engagement holes 6, 7. In addition, reference holes 8 used as a positioning reference or the like are made in the joints 3 of the carrier C of this embodiment substantially at the centers with respect to the axial direction and the circumferential direction of the joints 3.

The carrier C having such a structure can be formed through plastic deformation of a single material, for example, by spinning or drawing a plate material W using a tool such as a spatula or a press roller. Because the thus-formed carrier C is integrally formed of the flanges 1, 2 and the joints 3 with uninterrupted flow of a material, it is possible to reduce the number of parts and form the carrier C with a reduced number of processes, namely, without the necessity of performing assembling and bonding processes. Furthermore, the parallel precision of the opposed faces of the flanges 1, 2 can be enhanced at a low cost. Because the carrier demonstrates high rigidity, it is possible to reduce the thickness of the carrier and thus realize a structure allowing the weight saving of the carrier. As will be described later, if the carrier C is formed from the plate material W by drawing, the groove 4 is preliminarily formed in a portion which is to be the inside of the carrier and which is to be a border between the joints 3 and at least one of the flanges 1, 2 of the material W either along the entire circumference or discontinuously. Thereby, when the material W is closed off, it is urged to be bent along the groove 4. Therefore, the border between at least one of the flanges 1, 2 and the joints 3 is bent precisely. Accordingly, the parallel precision of the opposed faces of the flanges 1, 2 is further enhanced.

Figure 3:
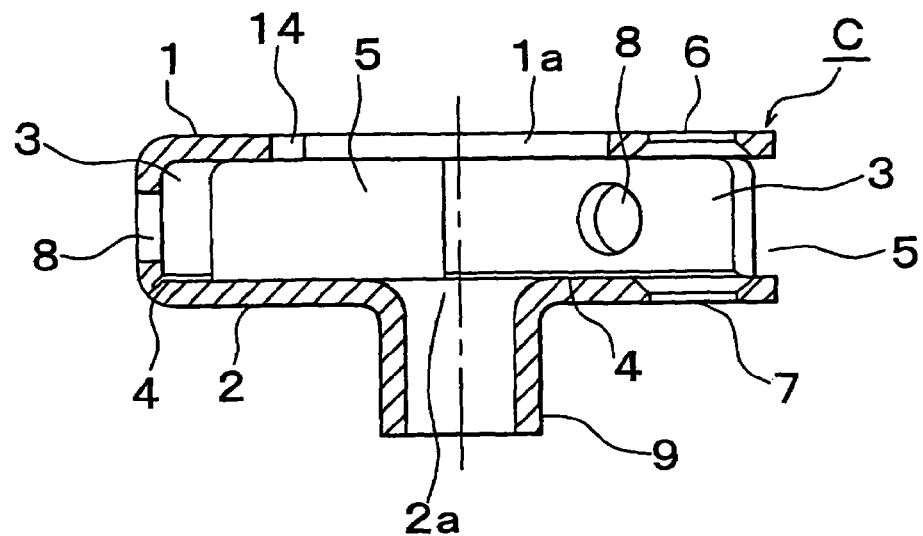
FIG. 3 is a cross-sectional view of a carrier according to another embodiment of the invention.
Figure 4:
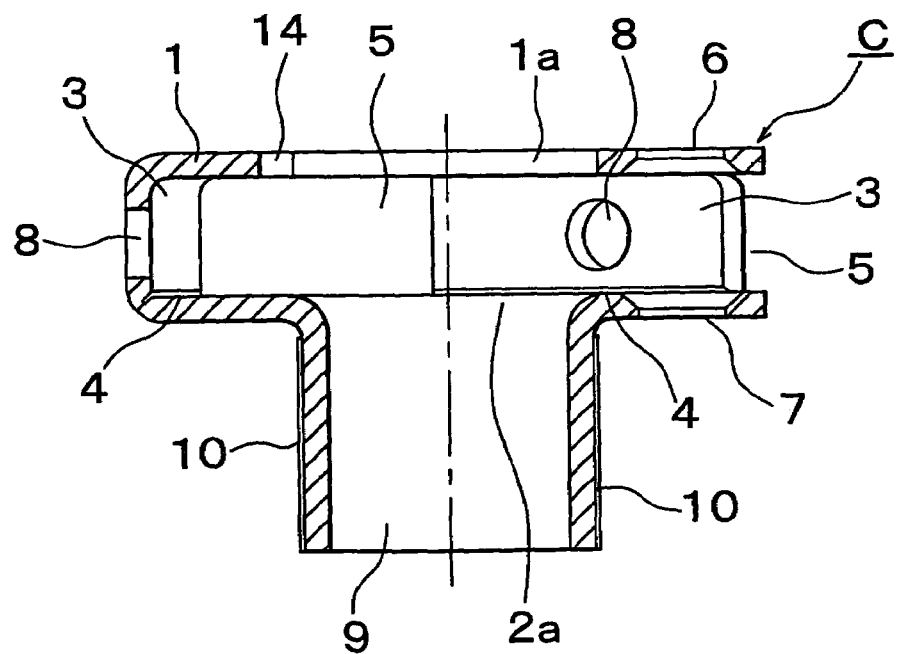
FIG. 4 is a cross-sectional view of a carrier according to still another embodiment of the invention.

The carrier C according to the invention is not limited to this embodiment. For example, in the case of the carrier C employed in the planetary gear unit or the like of the automatic transmission of the automobile as mentioned above, it is possible to integrally form a boss 9 so that it continues from the through-hole 1a or 2a formed at the center of at least one of the flanges 1, 2 as shown in FIG. 3 in case of necessity, and form a spline or a gear 10 in the integrally formed boss 9 as shown in FIG. 4. The carrier C of the invention is not necessarily employed in a planetary gear unit of an automatic transmission for an automobile or the like. That is, the carrier C according to the invention is applicable to other purposes.

Figure 39:
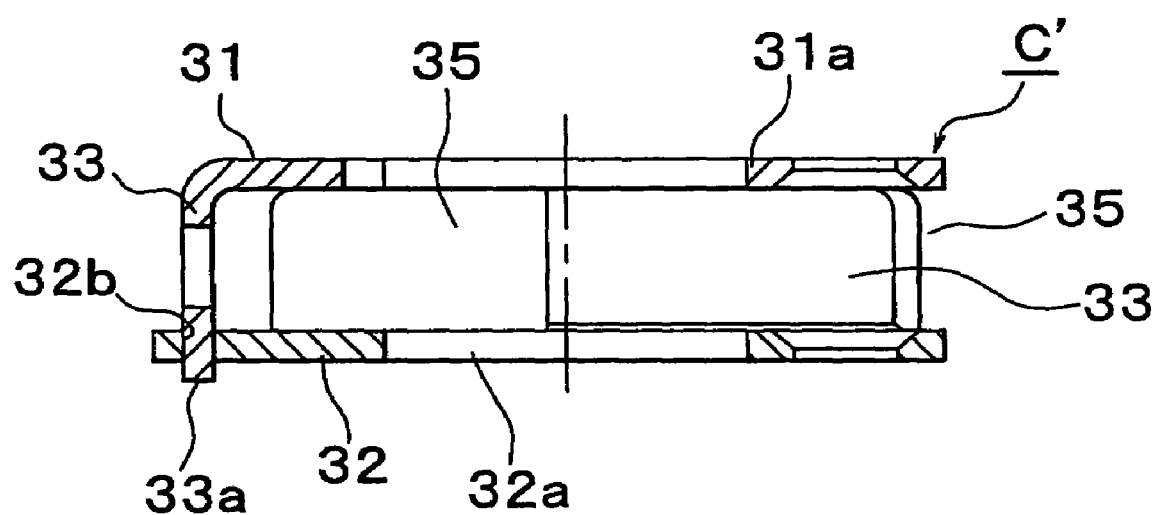
FIG. 39 is a cross-sectional view of a carrier according to the related art.

The thus-constructed carrier C of the invention eliminates the necessity to assemble the columns 33 of the carrier plate 31 with the base plate 32 as is the case with the carrier C' of the related arts (see FIG. 39). Thus, the parallel precision is not adversely affected by the forming tolerance or the assembling error of the carrier plate 31 and the base plate 32. The opposed faces of the flanges 1, 2 are formed with a high degree of parallel precision.

Next, a method of manufacturing the carrier C according to one embodiment of the invention will be described in detail with reference to FIGS. 5 through 28, which show a case where the carrier C constructed as described above is manufactured.

In the method of manufacturing the carrier C according to the invention, the carrier C having the flanges 1, 2 and rotatably supporting rotating bodies such as planetary gears between the flanges 1, 2 is manufactured. In this embodiment, the plate material W is bent and drawn into the shape of a cup, whereby the flange 1 is formed substantially at the center of the plate material W and a wall 11 (e.g. see FIG. 14) is formed on the outer periphery of the flange 1. A front-end opening in the wall 11 formed of an outer peripheral end face Wa of the material W is closed off, and the joints 3 and the flange 2 are integrally formed so that they continue from the flange 1. When the front-end opening of the material W formed into the shape of a cup or a tube (described later) is "closed off", it is formed so as to be shrunk radially inwardly.

Furthermore, in the method of manufacturing the carrier C according to the invention, among a series of the afore-mentioned processes, auxiliary openings 5' (e.g. see FIG. 11) or the openings 5 through which rotating bodies or the like can be inserted into the carrier C are made in pre-joints (3) of the plate material W before the plate material W is bent and drawn into the shape of a cup, and the engagement holes 6 for engagement with rotational shafts for rotatably supporting planetary gears designed as rotating bodies in the carrier C are made in at least one of pre-flanges (1). Further, the bending guide 4 is formed on the border between the joints 3 and at least one of the pre-flanges (1), (2) (e.g. see FIG. 16) before the material W is closed off, and closing-off mandrels 12 are inserted from the openings 5 made in the pre-joints (3) of the material W that has been bent and drawn into the shape of a cup (e.g. see FIG. 19). The outer peripheral end face Wa of the cup-shaped material W is closed off so as to be shrunk radially inwardly. Furthermore, swaging mandrels 13 are inserted into mounting positions of the rotating bodies between the flanges 1, 2 from the openings 5 made in the joints 3 of the closed-off carrier C (e.g. see FIG. 27), and the flanges 1, 2 are swaged towards the swaging mandrels 13.

Figure 5:
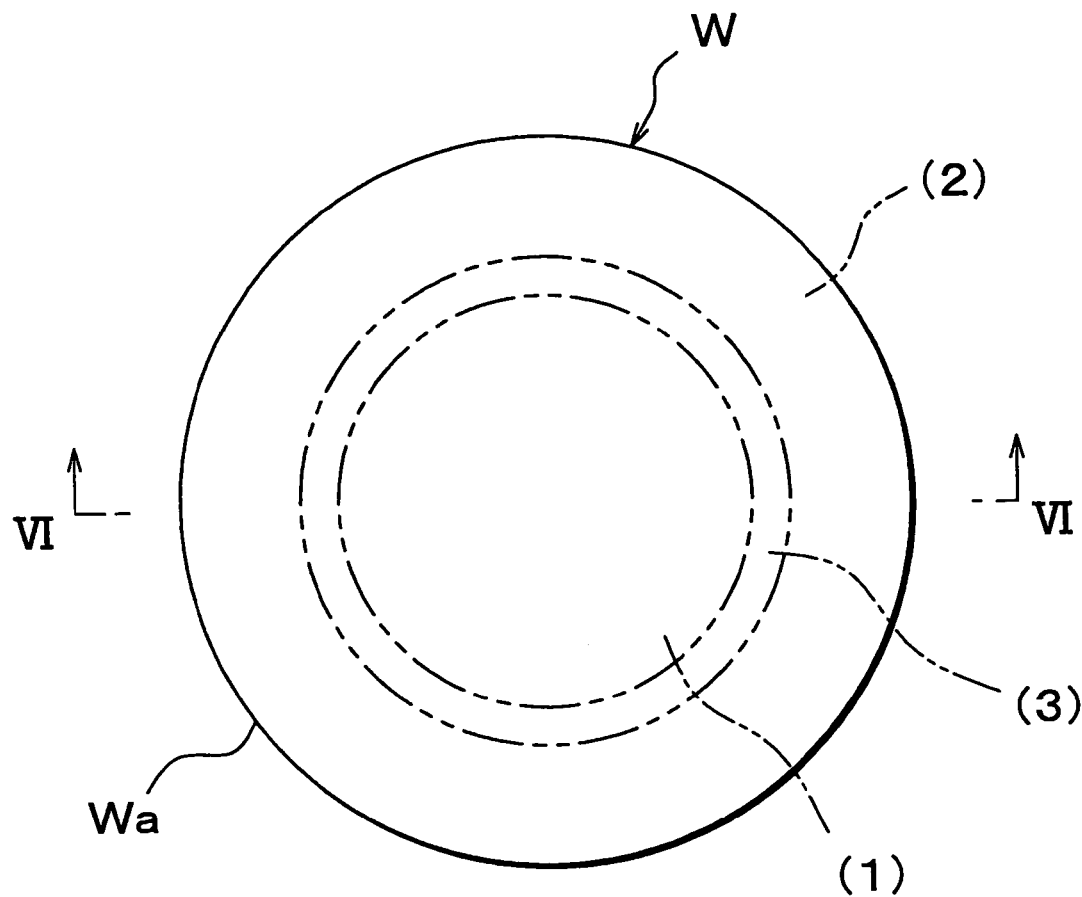
FIG. 5 is a plan view of a plate material for explaining a method of manufacturing a carrier according to the invention.
Figure 6:
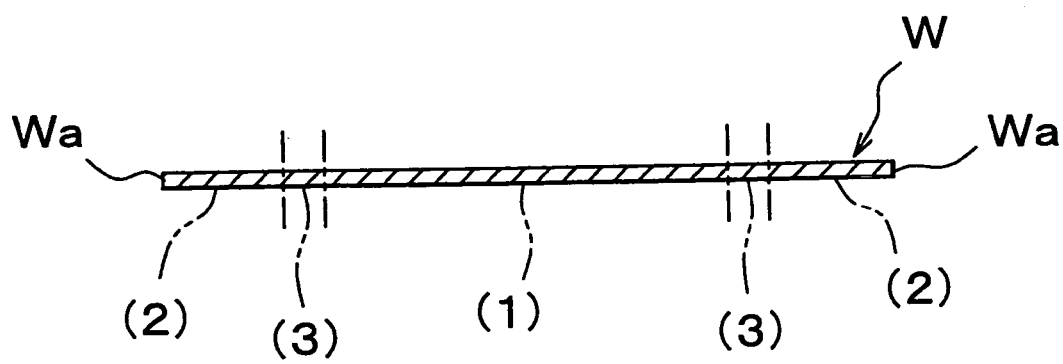
FIG. 6 is a cross-sectional view taken along a line VI—VI shown in FIG. 5.

Hereinafter, a series of manufacturing processes according to this embodiment of the invention will be described in detail. The plate material W of this embodiment is generally formed into the shape of a disc having a predetermined thickness as shown in FIGS. 5, 6. As indicated by chain lines in FIG. 5, the central portion of the plate material W corresponds to the pre-flange (1), and the outer peripheral edge of the plate material W corresponds to the pre-flange (2). An annular portion located between the central portion (1) and the outer peripheral edge (2) in the radial direction corresponds to the pre-joints (3).

Figure 7:
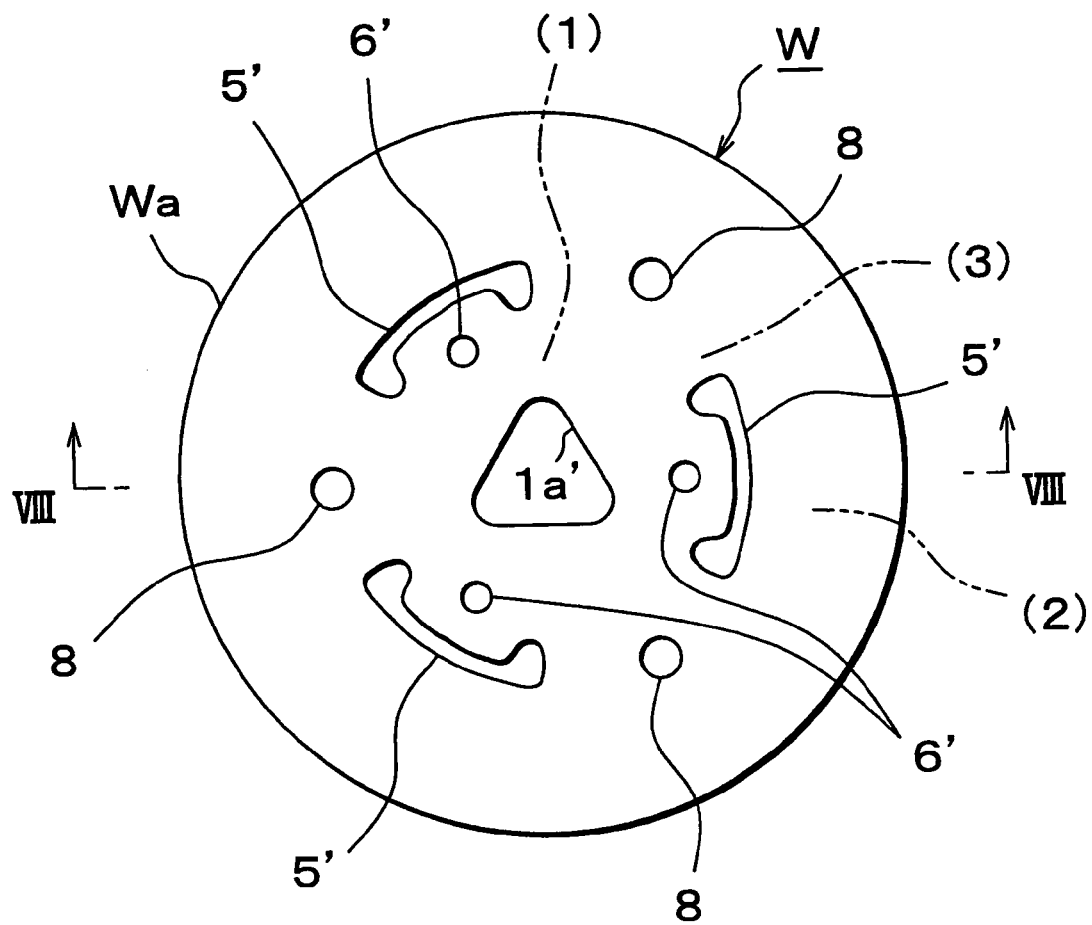
FIG. 7 is a plan view of a state where a pilot hole and engagement holes are made in one pre-flange of the plate material shown in FIG. 5 and where auxiliary openings and reference holes are made in pre-joints of the plate material shown in FIG. 5.
Figure 8:
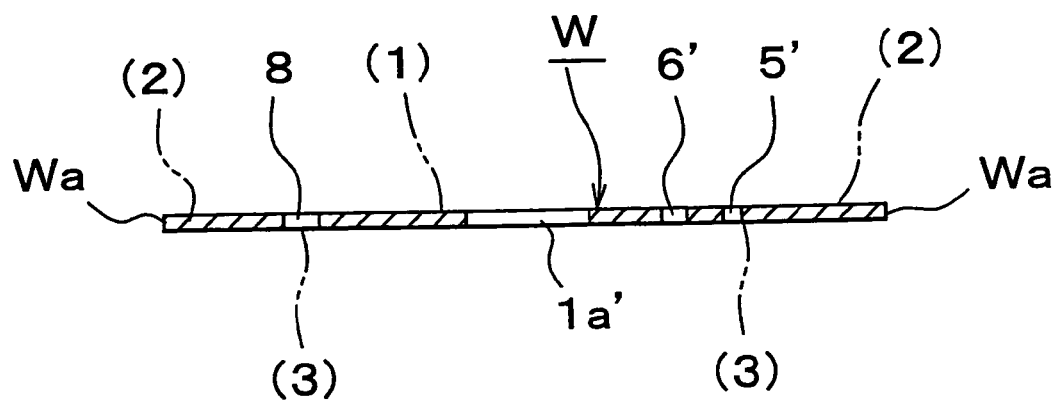
FIG. 8 is a cross-sectional view taken along a line VIII—VIII shown in FIG. 7.

As shown in FIGS. 7, 8, a generally triangular pilot hole 1a' is made at the center of the pre-flange (1) of the thus-formed plate material W, and three auxiliary holes 6', which are to be the engagement holes 6, are made around the pilot hole 1a'. For a later-described reason, the auxiliary holes 6' are set in a dimension slightly smaller than a dimension allowing engagement with the rotational shafts of the planetary gears. The three auxiliary openings 5' are made in the pre-joints (3) radially outwardly so as to correspond to the auxiliary holes 6'. The three reference holes 8 are made at the centers in the circumferential direction of the auxiliary openings 5' and slightly radially outwardly of the auxiliary openings 5'. The radial dimension of the auxiliary openings 5' is set to almost half of the width of the joints 3 (the distance between the flanges of the carrier). Then, more processes are performed to form the openings 5 through which planetary gears or the like can be inserted into the carrier C thus manufactured.

Figure 9:
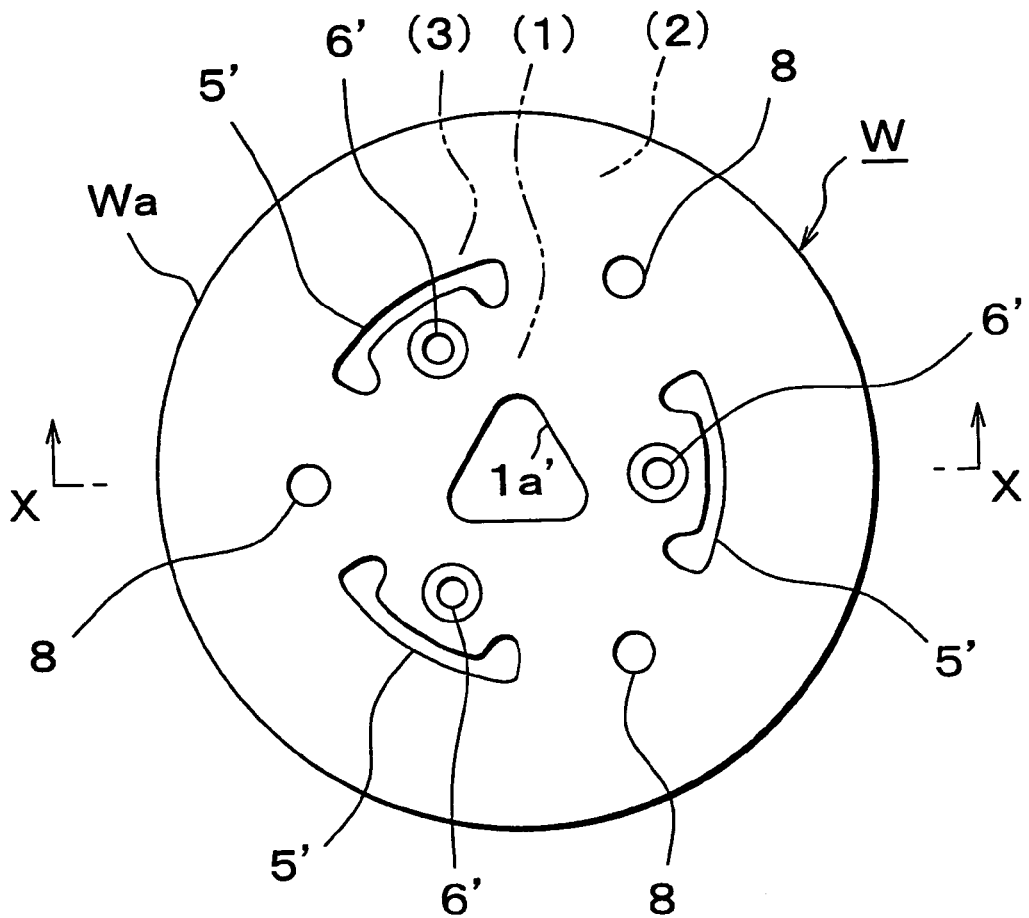
FIG. 9 is a plan view of a state where the engagement holes in the plate material shown in FIG. 7 are chamfered.
Figure 10:
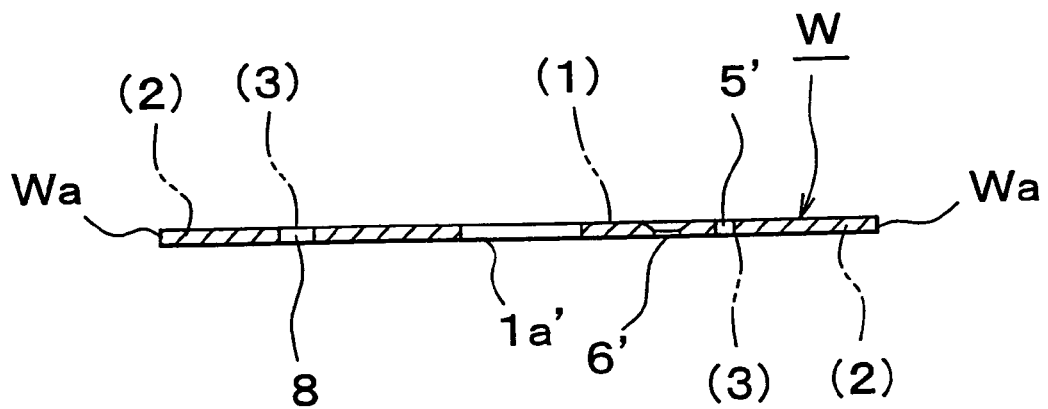
FIG. 10 is a cross-sectional view taken along a line X—X shown in FIG. 9.

Then, as shown in FIGS. 9, 10, after the auxiliary holes 6' have been made, the plate material W is chamfered by press working, cutting operations or the like so that the peripheries of sides of the auxiliary holes 6' which are to be the inside of the carrier C are inclined with a diameter gradually increasing towards the inside of the carrier C. The dimension of the auxiliary holes 6' made in advance changes because of the chamfering. The chamfering means that the side of the auxiliary holes 6' which is to be the inside of the carrier C is scraped off.

Figure 11:
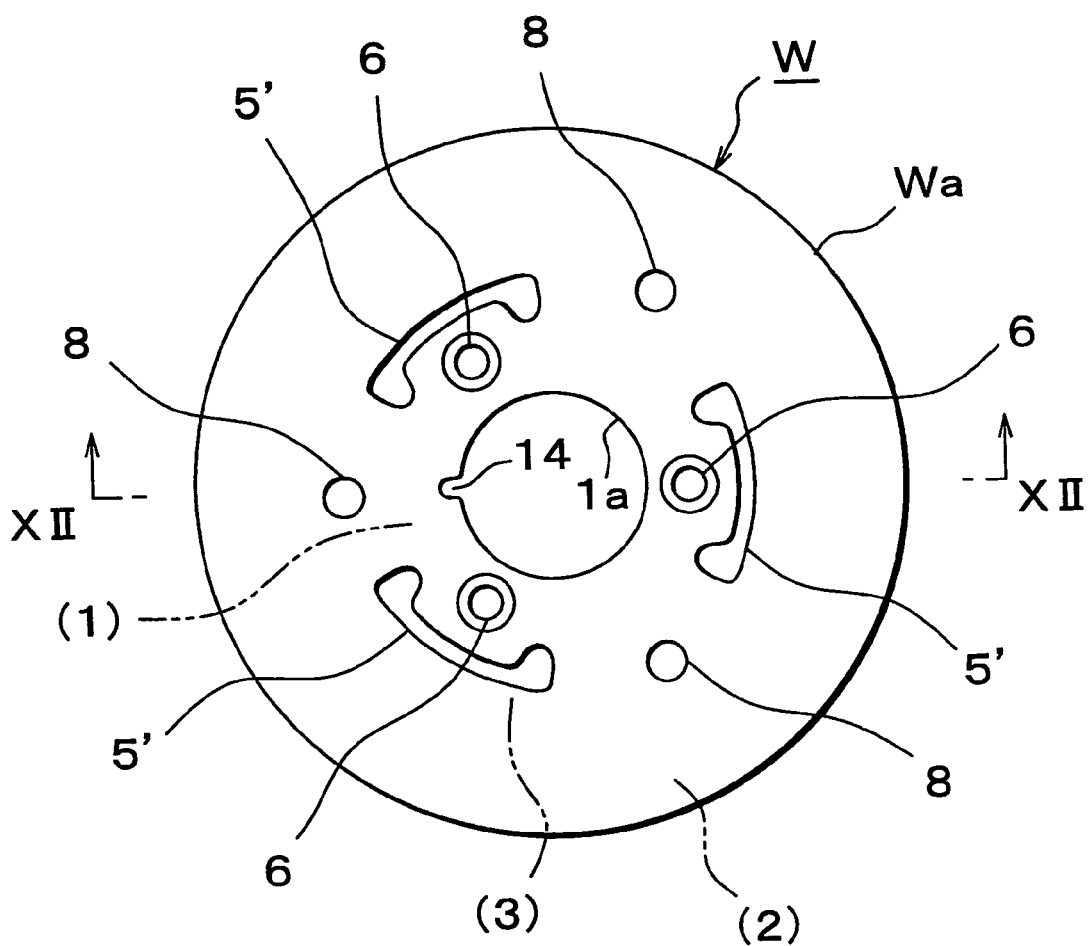
FIG. 11 is a plan view of a state where the pilot holes in the plate material shown in FIG. 9 are formed into through-holes and where the engagement holes in the plate material shown in FIG. 9 are finished to a dimension allowing engagement with rotational shafts of rotating bodies.
Figure 12:
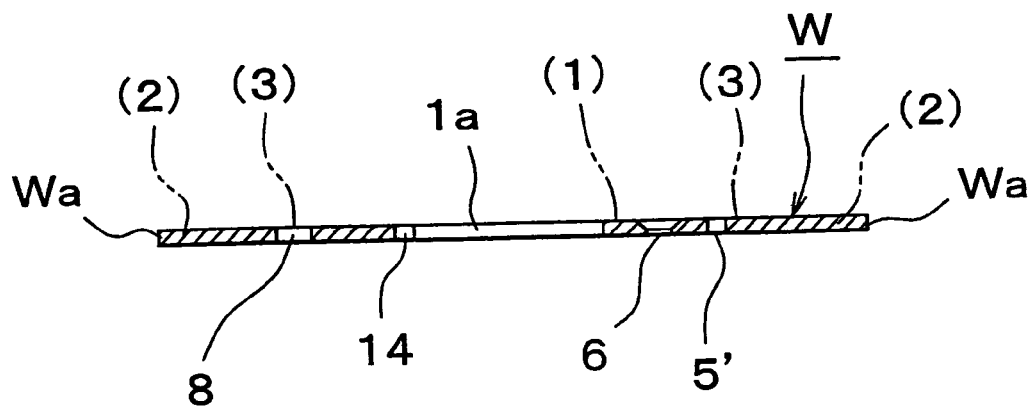
FIG. 12 is a cross-sectional view taken along a line XII—XII shown in FIG. 11.

Then, as shown in FIGS. 11, 12, the plate material W is punched so that the periphery of the pilot hole 1a' assumes a generally circular shape, and one of the through-holes 1a through which shafts (not shown) and sun gears (not shown) are inserted is made. A notch 14 as a mark is made in the circular through-hole 1a for example for the purpose of detecting the rotational phase of the formed carrier C in the circumferential direction. The chamfered auxiliary holes 6' are finished into the engagement holes 6 having a dimension allowing engagement with the rotational shafts of the planetary gears.

Figure 13:
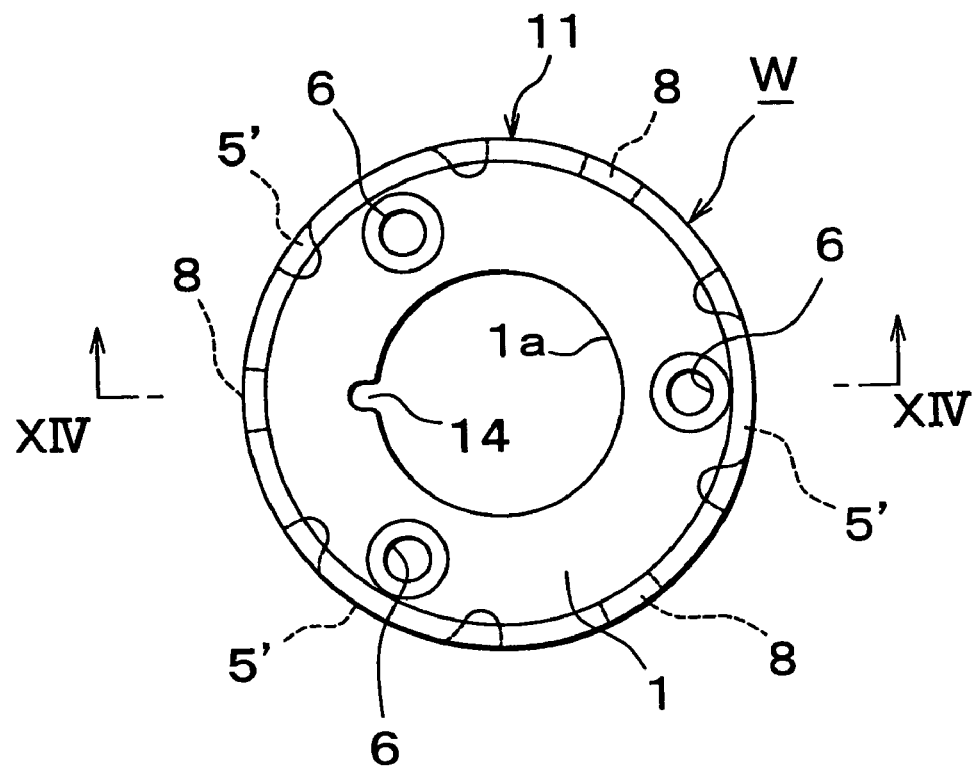
FIG. 13 is a plan view of a cup-shaped material that has been formed by bending and drawing the plate material shown in FIG. 11.
Figure 14:
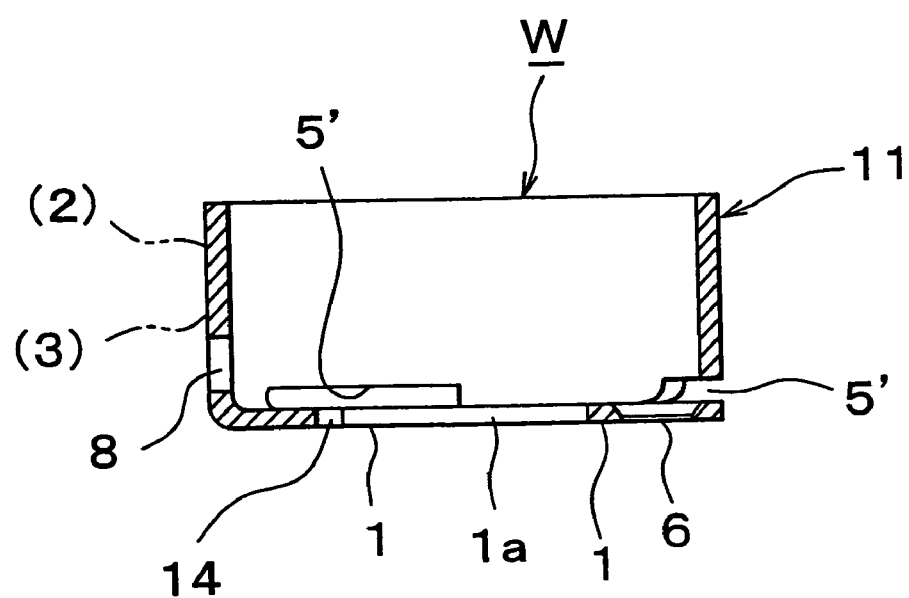
FIG. 14 is a cross-sectional view taken along a line XIV—XIV shown in FIG. 13.

Then, as shown in FIGS. 13, 14, the plate material W is bent and drawn into the shape of a cup by means of pressing or the like, and the flange 1 and the wall 11 extending substantially perpendicularly to the outer periphery of the flange 1 are formed. By being closed off in one of the following processes, the wall 11 constitutes the joints 3 and the other flange 2. The auxiliary openings 5' made in advance have almost half of the height of the pre-joints (3) extending from the outer peripheral edge of the flange 1 to the wall 11.

Figure 15:
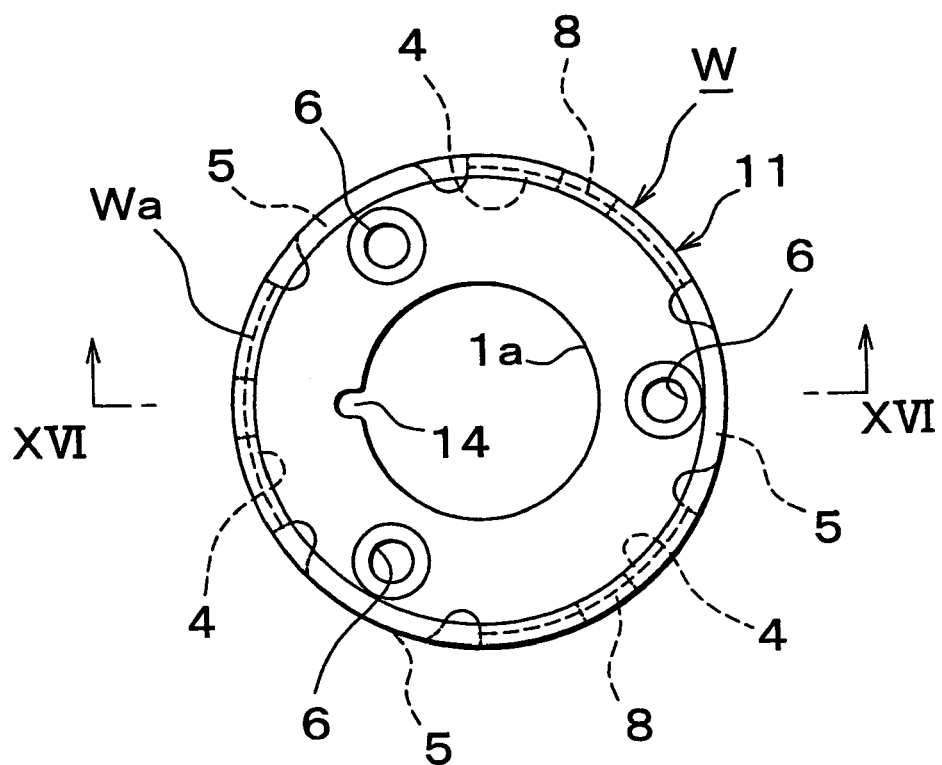
FIG. 15 is a plan view of a state where a groove designed as a bending guide is formed on the border between pre-joints and the other pre-flange on the inner periphery of a wall of the cup-shaped material shown in FIG. 13.
Figure 16:
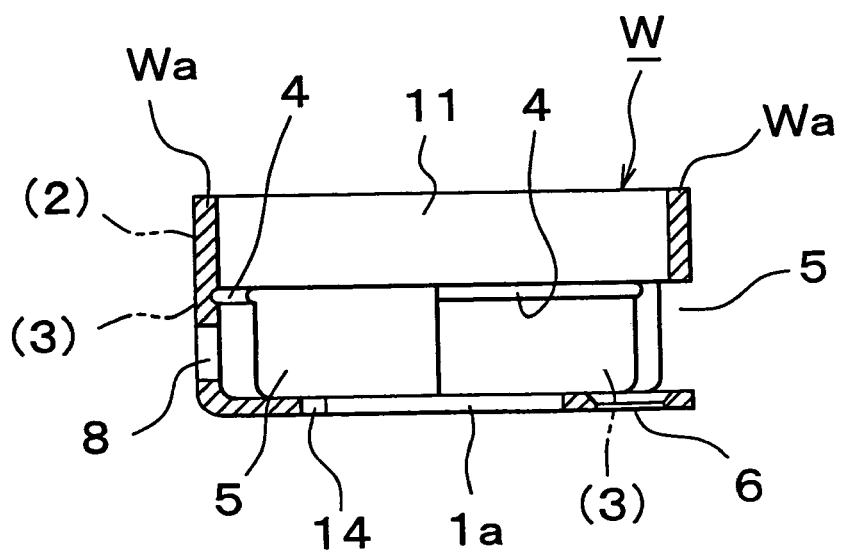
FIG. 16 is a cross-sectional view taken along a line XVI—XVI shown in FIG. 15.

Then, as shown in FIGS. 15, 16, in order to ensure that planetary gears (not shown) or the like can be inserted into the later-manufactured carrier, the auxiliary openings 5 are punched on the front-end side of the wall 11 to a predetermined height and formed into the openings 5. At the same time or almost simultaneously, the groove 4 designed as a bending guide is formed on the border between the pre-flange (2) and the pre-joints (3) on the inner periphery of the wall 11 either along the entire circumference or discontinuously.

Figure 17:
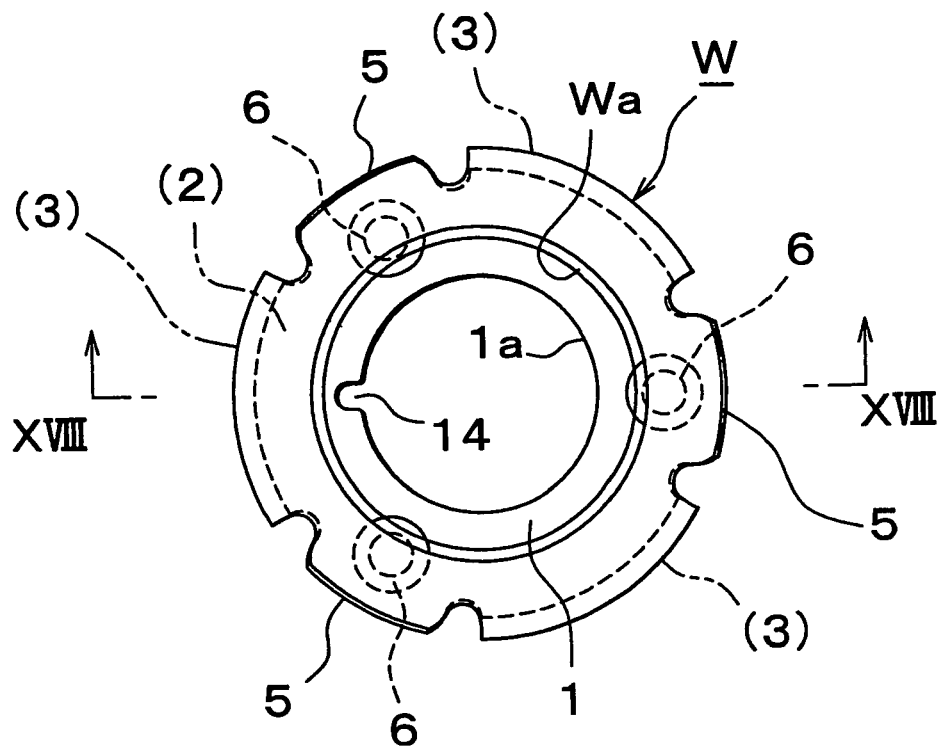
FIG. 17 is a plan view of a state where front-end openings in the wall of the cup-shaped material shown in FIG. 15 are preliminarily closed off at an appropriate angle from the groove so that the front-end openings are slightly shrunk radially inwardly.
Figure 18:
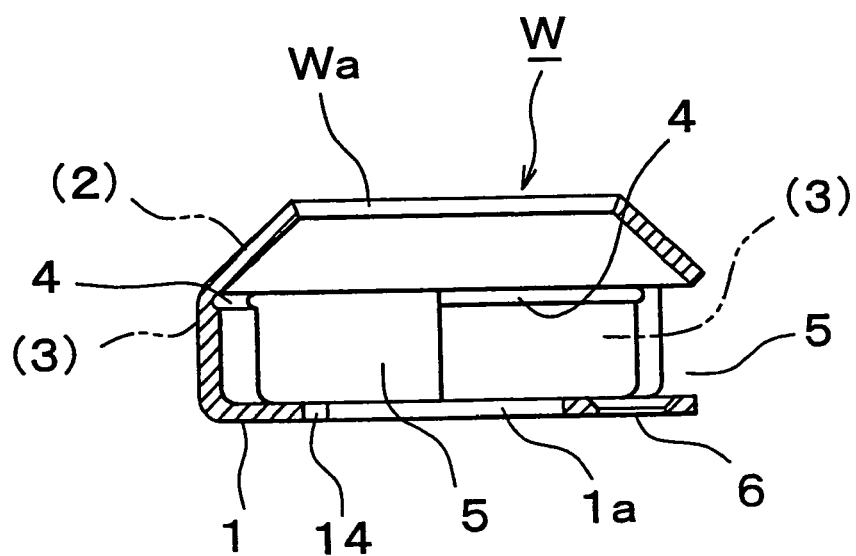
FIG. 18 is a cross-sectional view taken along a line XVIII—XVIII shown in FIG. 17.

Then, as shown in FIGS. 17, 18, the wall 11 is preliminarily closed off at an appropriate angle from the groove 4 so that the front-end opening in the wall 11 (the outer peripheral end face Wa of the material W) is slightly shrunk radially inwardly.

Figure 19:
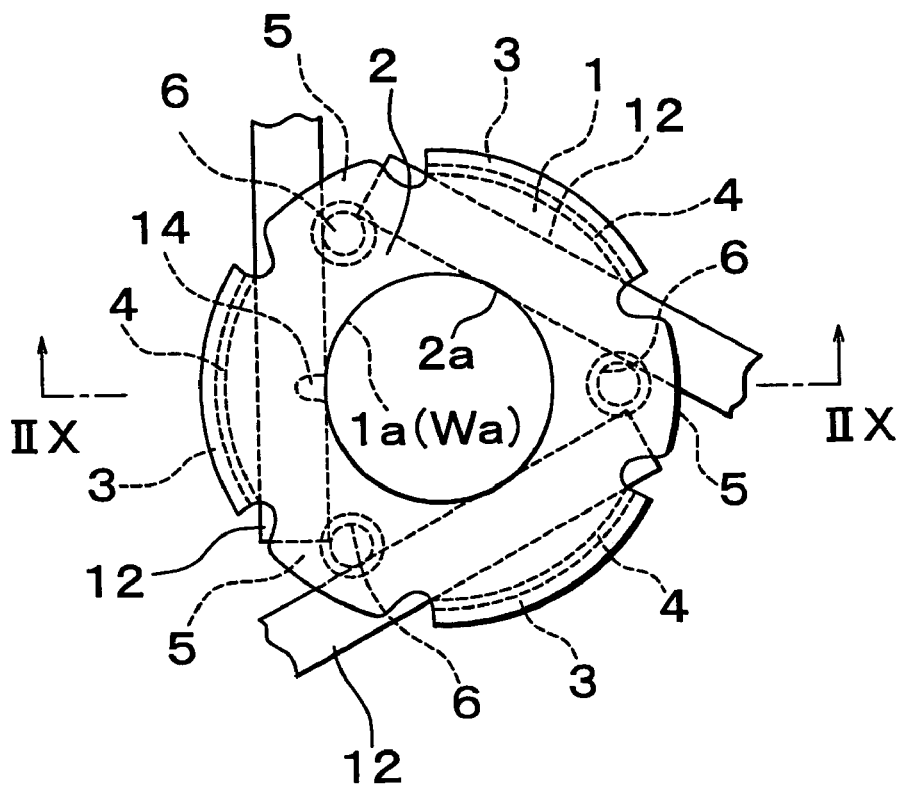
FIG. 19 is a plan view of a state where mandrels are inserted through the openings preliminarily closed off as shown in FIG. 17 so that the front-end openings in the wall are shrunk radially inwardly.
Figure 20:
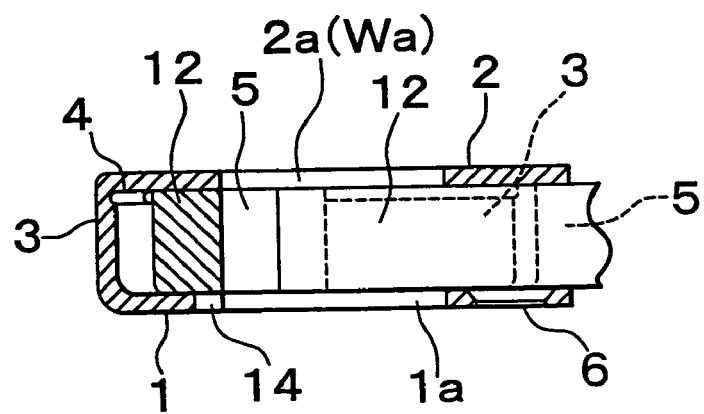
FIG. 20 is a cross-sectional view taken along a line IIX—IIX shown in FIG. 19.
Figure 29:
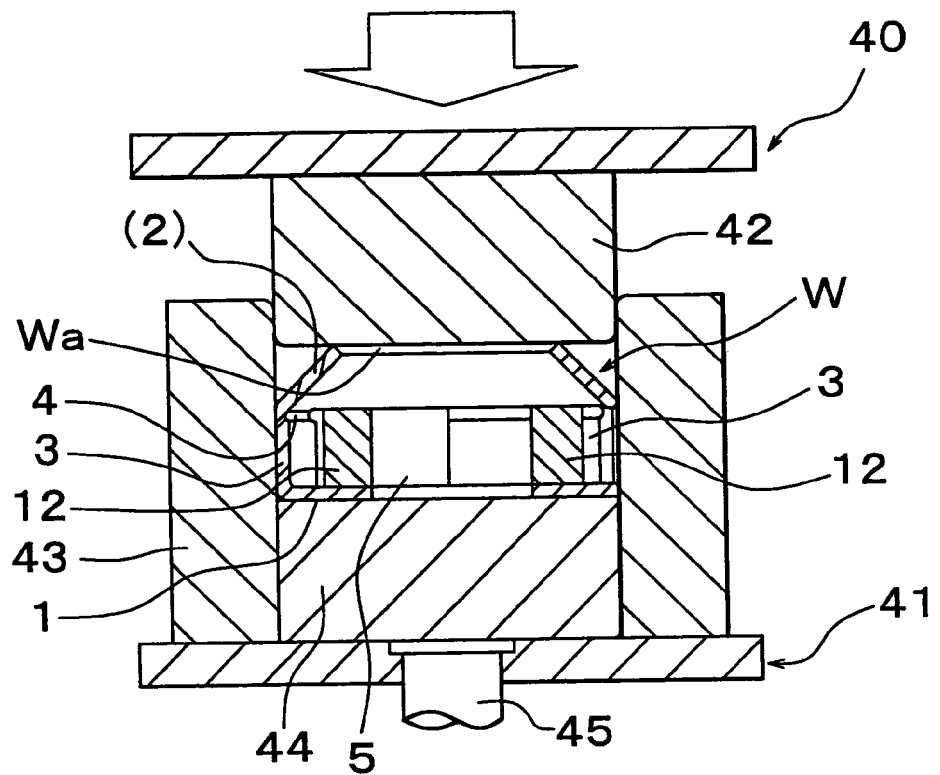
FIG. 29 is a cross-sectional view of a pressing machine according to one embodiment of the invention in a state where the preliminarily closed-off material is being closed off.
Figure 30:
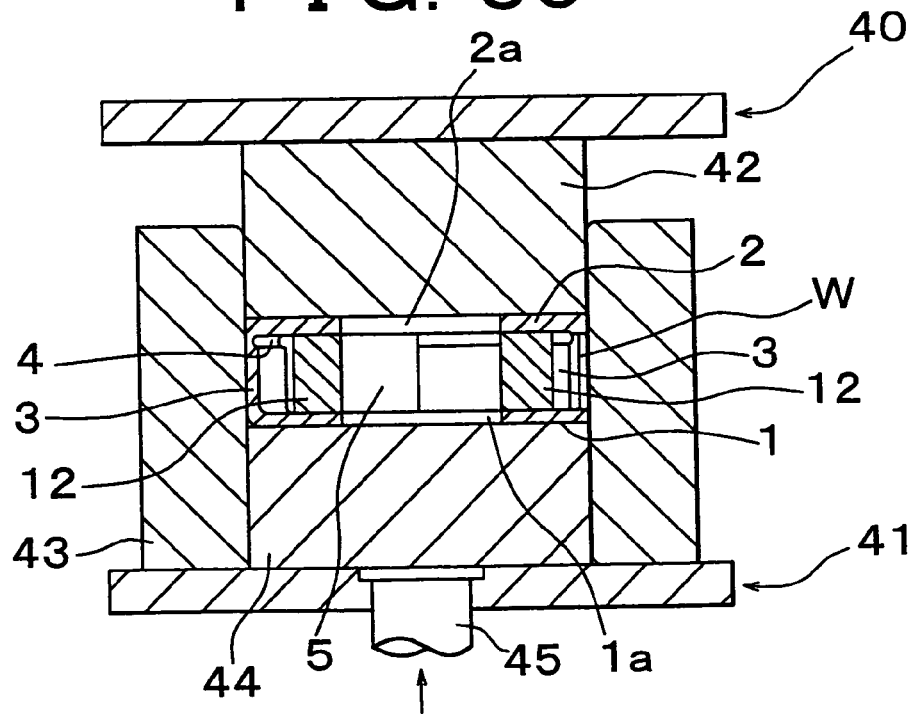
FIG. 30 is a cross-sectional view of a pressing machine according to one embodiment of the invention in a state where the material shown in FIG. 29 has been closed off.

Thereafter, according to this embodiment, as shown in FIGS. 19, 20, each of the closing-off mandrels 12 is inserted from one of the openings 5 to another one adjacent thereto so as to be close to a corresponding one of the joints 3, and pressed by a pressing machine shown in FIGS. 29, 30. The material W is then closed off so that the front-end opening in the wall 11 (the cup-shaped opening defined by the outer peripheral end face Wa of the material W) is shrunk radially inwardly, until the pre-flange (2) becomes parallel to the flange 1.

A pressing machine for closing off the preliminarily closed-off material according to an embodiment of the invention will be described. As shown in FIGS. 29, 30, the pressing machine has an upper mold 40 and a lower mold 41, which are vertically movable relative to each other. The upper mold 40 has a punch 42, which presses the front-end opening Wa of the preliminarily closed-off material W when the upper mold 40 is relatively close to the lower mold 41. The lower mold 41 has a die 43 for accommodating the preliminarily closed-off material W, an ejector 44 slidably fitted into the die 43 to support the material W, and an ejector rod 45 for vertically moving the ejector 44 in the die 43. The inner diameter of the die 43 is approximately equal to the diameter of a bottom of the cup-shaped material W, which is to be the flange 1. Although not shown, holes are made in the die 43 so as to correspond to the openings 5 made between the joints 3 of the material W. The closing-off mandrels 12 can be inserted into the openings 5 in the material W through the holes (see FIG. 19). The height of the closing-off mandrels 12 is approximately equal to the distance between the inner faces of the flanges 1, 2 of the carrier C.

When the preliminarily closed-off material W is closed off, the material W is first accommodated in the die 43 with the upper mold 40 and the lower mold 41 being spaced apart from each other, and the closing-off mandrels 12 are inserted from the openings 5. In this state, if the upper mold 40 and the lower mold 41 are moved towards each other, the punch 42 presses the front-end opening Wa of the preliminarily closed-off material W as shown in FIG. 29. Thereby the preliminarily closed-off material W is bent so that the front-end opening Wa of the material W is shrunk radially inwardly, until the wall 11 extends substantially at a right angle from the groove 4, namely, until the wall 11 becomes parallel to the flange 1. Thus, the portions among the openings 5 in the circumferential direction constitute the joints 3, and the portion (2) which substantially forms a right angle with the joints 3 and which extends parallel to the flange 1 constitutes the flange 2. That is, the foregoing processes are performed to integrally form the joints 3 and the flange 2 so that they continue from the flange 1. The closed-off front-end opening (the outer peripheral end face Wa) constitutes the through-hole 2a through which a shaft (not shown) or a sun gear (not shown) is inserted. At this moment, especially the front-end opening Wa of the closed-off material W generally tends to be crimpled because the material is compressed in the circumferential direction by being shrunk. However, the material W is thick enough to demonstrate rigidity for preventing especially the front-end opening Wa from being crimpled but is thin enough to sufficiently save the weight of the carrier C. In addition, according to the invention, since the pre-flange (2) of the wall 11 is pressed so as to be sandwiched between the closing-off mandrels 12 and the punch 42 as shown in FIG. 30, the material W is prevented from being crimpled. Because the auxiliary openings 5' and the openings 5 are made in advance before the material W is bent and drawn, the end faces of the flanges 1, 2 facing the openings 5 are not curved so as to face each other. Because the flanges 1, 2 and the joints 3 are integrally formed with uninterrupted flow of the material W, the carrier C is formed with high rigidity. For this reason, the flanges 1, 2 and the joints 3 can be made relatively thin, whereby it becomes possible to save the weight of the carrier C. After the material W has been closed off, the upper mold 40 and the lower mold 41 are moved away from each other. The ejector 44 is then raised with respect to the die 43 by driving the ejector rod 45, and the thus-formed carrier C is fetched from the die 43.

Figure 21:
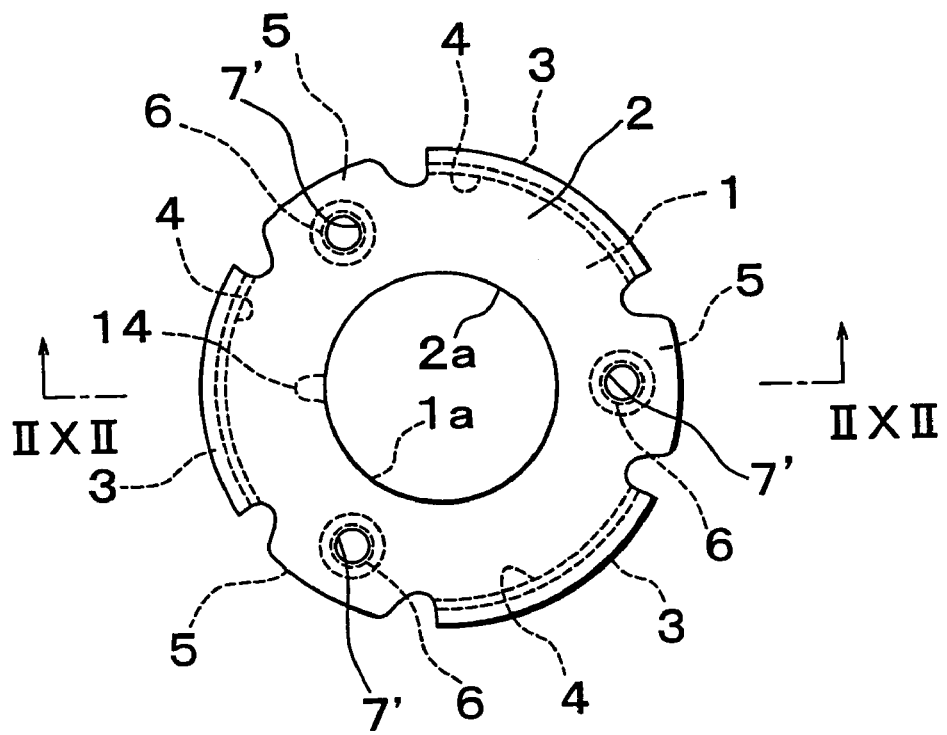
FIG. 21 is a plan view of a state where engagement holes are made in the other flange of the material shown in FIG. 19.
Figure 22:
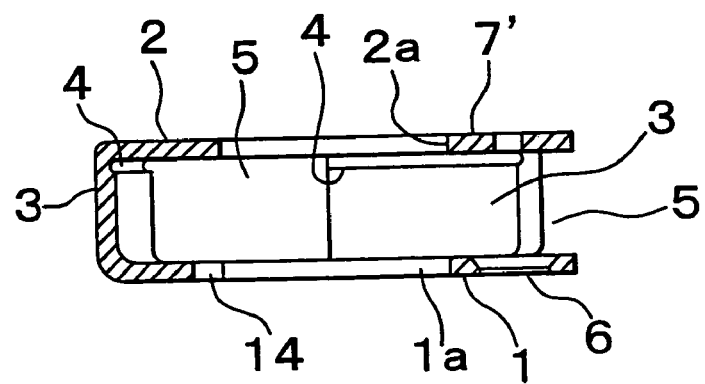
FIG. 22 is a cross-sectional view taken along a line IIXII—IIXII shown in FIG. 21.
Figure 23:
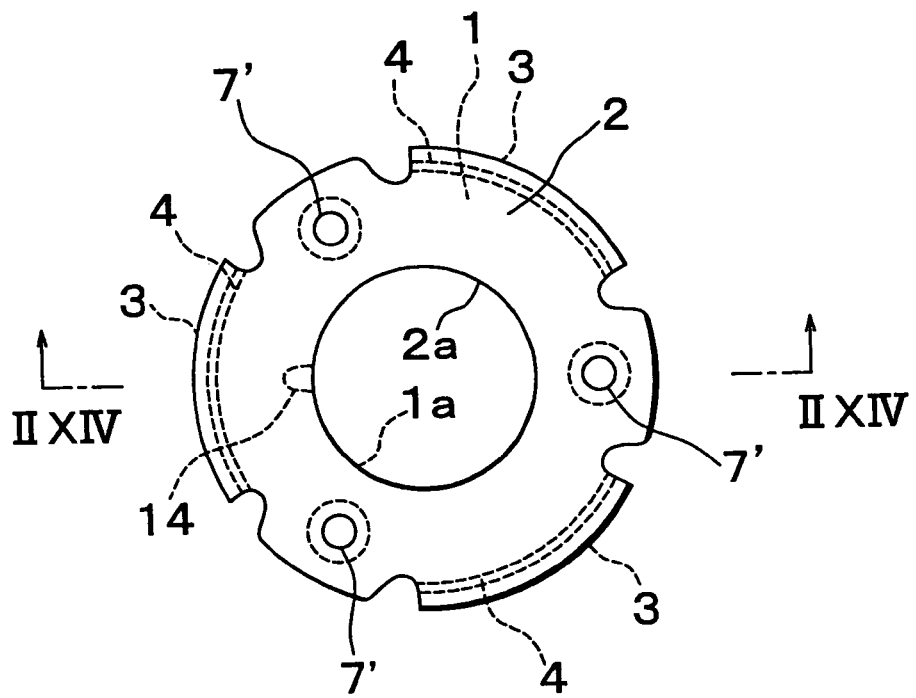
FIG. 23 is a plan view of a state where the engagement holes shown in FIG. 21 are chamfered.

Thereafter, as shown in FIGS. 21, 22, auxiliary holes 7' are made in the flange 2 of the carrier C so as to correspond to the engagement holes 6 made in the flange 1. As is the case with the auxiliary holes 6' (see FIGS. 7, 8) first made in the flange 1, the auxiliary holes 7' are set in a dimension slightly smaller than a dimension allowing engagement with the rotational shafts of the planetary gears. As is the case with the engagement holes 6 in the flange 1, as shown in FIGS. 23, 24, after the auxiliary holes 7' have been made, the material W is chamfered so that the peripheries of sides of the auxiliary holes 7' which are to be the inside of the carrier C are inclined with a diameter gradually increasing towards the inside of the carrier C.

Figure 24:
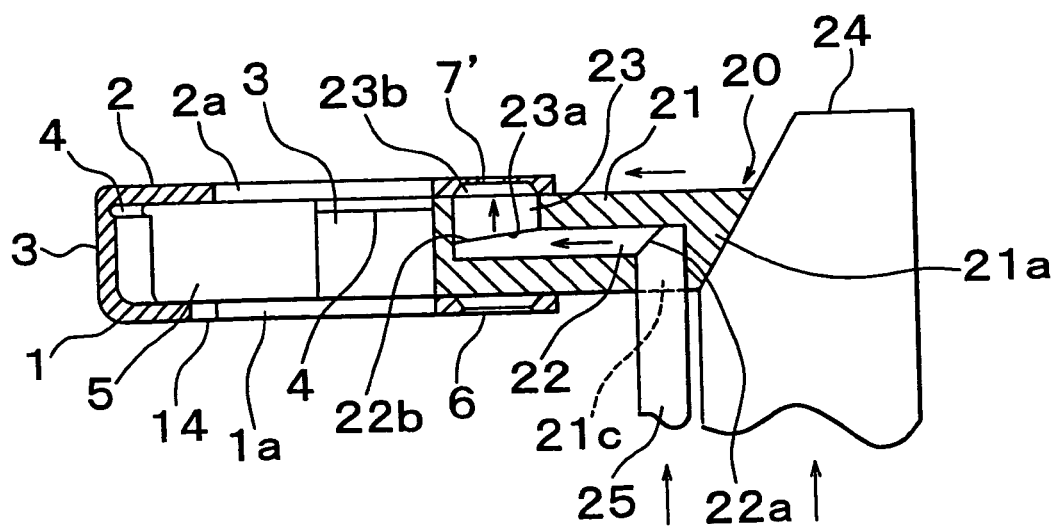
FIG. 24 is a cross-sectional view which is taken along a line IIXIV—IIXIV shown in FIG. 23 and which also shows a chamfering machine according to one embodiment of the invention.

The auxiliary holes 7' can be chamfered using a chamfering machine 20 as shown in FIG. 24. The chamfering machine 20 has a master cam member 21 inserted into the carrier C through one of the openings 5, an auxiliary cam member 22 longitudinally movably supported in the master cam member 21, and a chamfering punch 23 protruded from the master cam member 21 by the auxiliary cam member 22. One end face 21a of the master cam member 21 is inclined in the shape of a cam so that the chamfering punch 23 moves into the opening 5 and faces a corresponding one of the auxiliary holes 7' as a cam 24 moves vertically. The chamfering punch 23, which faces one of the engagement holes 7 to be chamfered, is retained at the other end of the master cam member 21 such that the chamfering punch 23 can protrude therefrom. End faces 22a, 22b of the auxiliary cam member 22 are inclined in the shape of a cam, and an insertion hole 21c is made in the master cam member 21 at the end on the side of the cam-shaped end face 21a so that a cam 25 can press the cam-shaped end face 22a of the auxiliary cam member 22. Furthermore, an end face 23a of the chamfering punch 23 located in the master cam member is inclined in the shape of a cam so as to correspond to the inclination of the end face 22b of the auxiliary cam member 22. The other end face 23b of the chamfering punch 23 is formed so as to correspond to a shape into which the engagement holes 7 are chamfered.

In the thus-constructed chamfering machine 20, the master cam member 21 is disposed so as to correspond to one of the openings 5 between the joints 3. If the cam-shaped end face 21a of the master cam member 21 is pressed by the cam 24 that is vertically driven by a pressing machine (not shown), the chamfering punch 23 moves so as to match a corresponding one of the unchamfered auxiliary holes 7' and the master cam member 21 is inserted into a space between the flanges 1, 2 through the opening 5 of the joints 3. At this moment, the cam-shaped end face 22a of the auxiliary cam member 22 on the side of the insertion hole 21c is not being pressed by the cam 25. Accordingly, the chamfering punch 23 is accommodated in the master cam member 21 without protruding therefrom.

Thereafter, if the cam-shaped end face 22a of the auxiliary cam member 22 on the side of the insertion hole 21a is pressed by the cam 25, the chamfering punch 23 protrudes from the master cam member 21. After the auxiliary holes 7' have been made, the peripheries of their sides which are to be the inside of the carrier C are inclined with a diameter gradually increasing towards the inside of the carrier C and chamfered.

Figure 25:
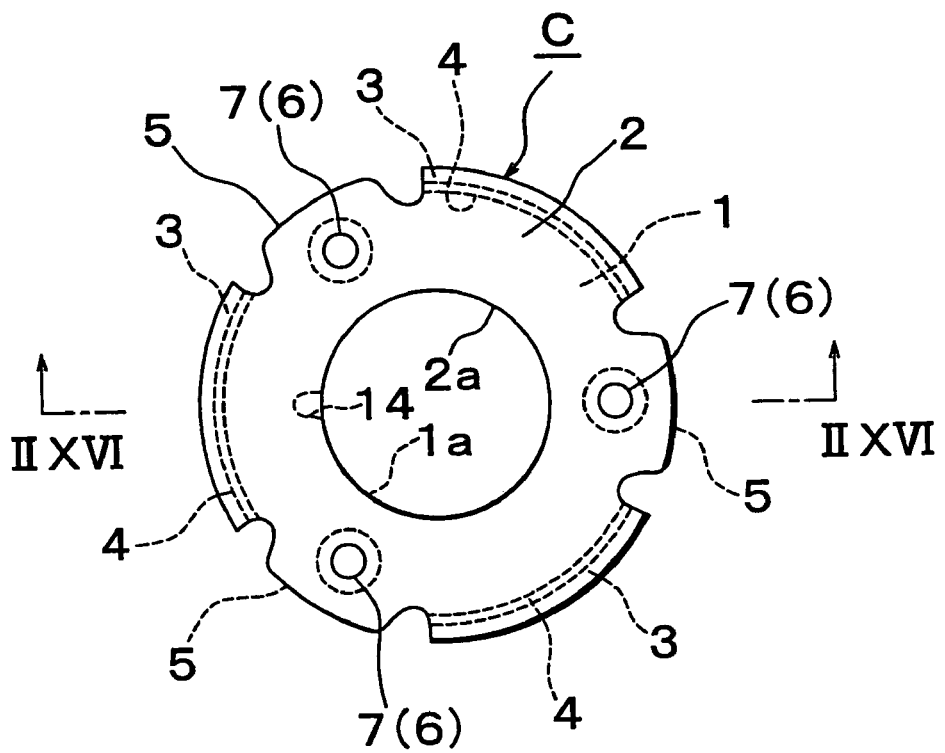
FIG. 25 is a plan view of a state where the engagement holes chamfered as shown in FIG. 23 are finished to a dimension allowing engagement with rotational shafts of rotating bodies.
Figure 26:
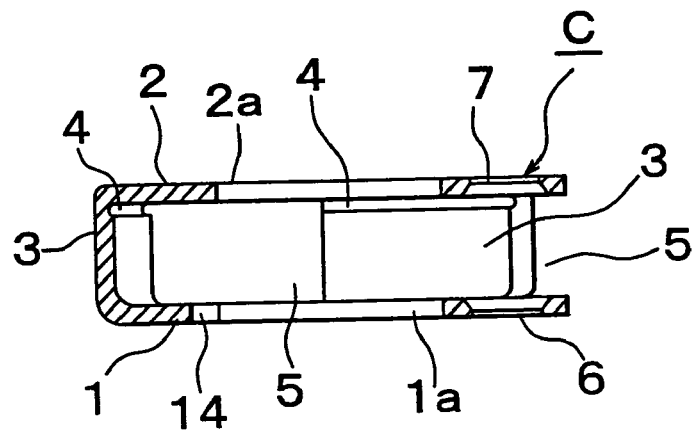
FIG. 26 is a cross-sectional view taken along a line IIXVI—IIXVI shown in FIG. 25.

After completion of the aforementioned chamfering of the auxiliary holes 7', the auxiliary holes 7' that have changed in dimension by being chamfered are finished into the engagement holes 7 having a dimension allowing engagement with the rotational shafts of the planetary gears, as shown in FIGS. 25, 26.

Figure 27:
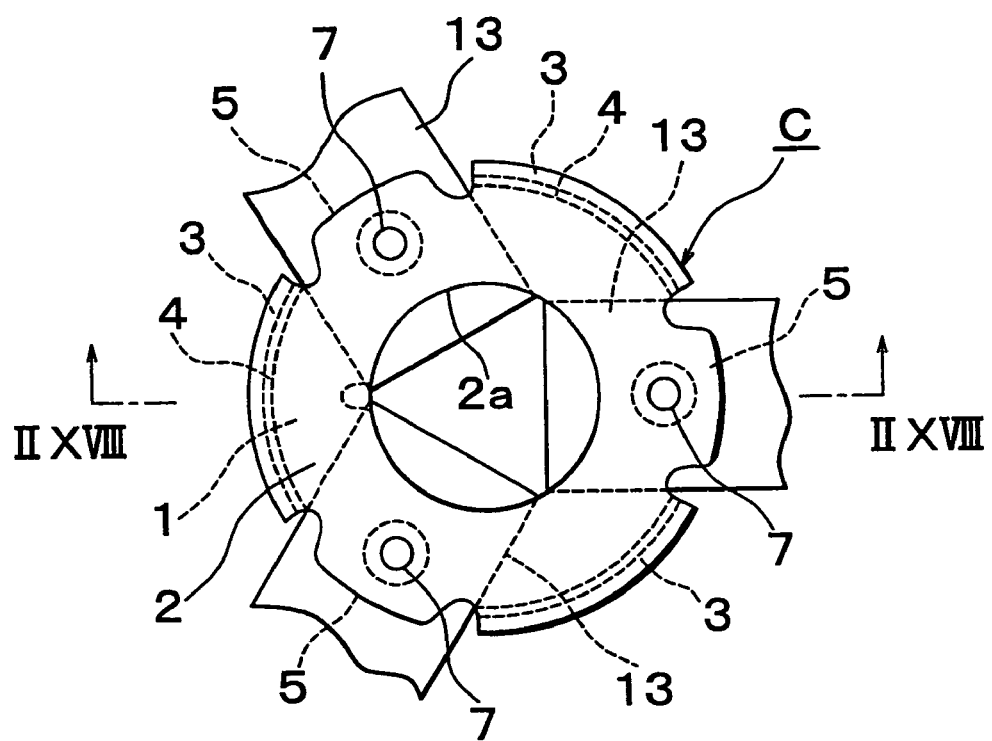
FIG. 27 is a plan view of a state where mandrels are inserted from openings made in the joints of the carrier shown in FIG. 25 through positions for mounting rotating bodies between both the flanges and where both the flanges are swaged towards the mandrels.
Figure 28:
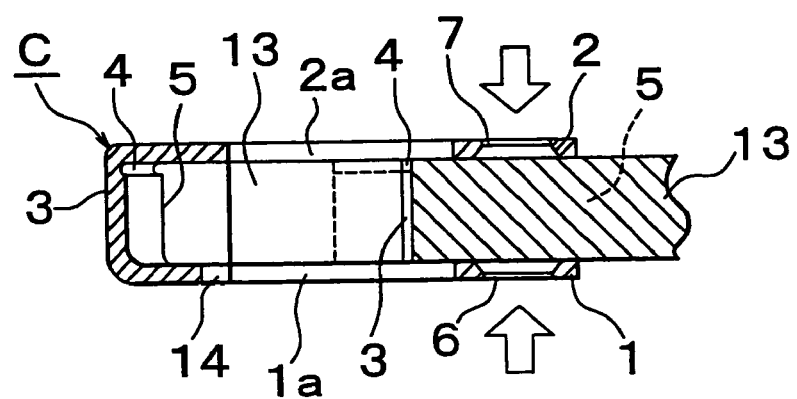
FIG. 28 is a cross-sectional view taken along a line IIXVIII—IIXVIII shown in FIG. 27.

Finally in the thus-formed carrier C, as shown in FIGS. 27, 28, while the swaging mandrels 13 are inserted through the openings 5 and disposed in positions which are between the flanges 1, 2 and which are around the engagement holes 6, 7 for engagement with the rotational shafts of the planetary gears, namely, positions which at least serve to mount the rotating bodies, the flanges 1, 2 are coined towards the swaging mandrels 13 by a press (not shown) or the like, as shown in FIGS. 27, 28. Coining means a process of finishing the flanges while pressing them by means of a press or the like for the purpose of eliminating the surface roughness of the flanges. At the same time, coining helps enhance the parallel precision of the flanges 1, 2. The swaging mandrels 13 have parallel faces which are opposed to the flanges 1, 2. The width (height) of the faces is set so as to substantially coincide with a desired distance between the opposed faces of the flanges 1, 2 of the carrier C. Thus, according to the invention, the flanges 1, 2 and the joints 3 are integrally formed and the opposed faces of the flanges 1, 2 of the carrier C are swaged towards the swaging mandrels 13, whereby it becomes possible to form the carrier C with high degrees of parallel precision and dimensional precision.

In the thus-formed carrier C, planetary gears are inserted into a space between the flanges 1, 2 from the openings 5, and the ends of rotational shafts of the planetary gears engage the engagement holes 6, 7 made in the flanges 1, 2 respectively. The planetary gears are rotatably and stably supported with their rotational shafts being supported by both the flanges 1, 2 which demonstrate a high degree of parallel precision.

Methods of manufacturing a carrier according to other embodiments of the invention will be described with reference to FIGS. 31 through 38. The description of the following embodiments will be focused on what is different from the aforementioned embodiment. The components similar to or corresponding to those in the aforementioned embodiment will be denoted by the same reference numerals, and the description of the components or the detailed description and graphical representation of the components will be omitted.

FIG. 31 shows a method of manufacturing the carrier C according to a second embodiment of the invention. FIG. 32 shows a third embodiment of the invention. FIG. 33 shows a fourth embodiment of the invention. FIG. 34 shows a fifth embodiment of the invention. FIG. 35 shows a sixth embodiment of the invention. FIG. 36 shows a seventh embodiment of the invention. FIG. 37 shows an eighth embodiment of the invention. FIG. 38 shows a ninth embodiment of the invention.

Figure 31A:
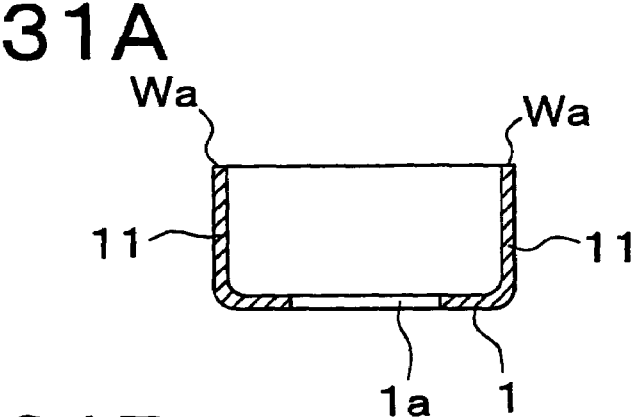
FIG. 31 is a cross-sectional view of a method of manufacturing a carrier according to a second embodiment of the invention.
Figure 31B:
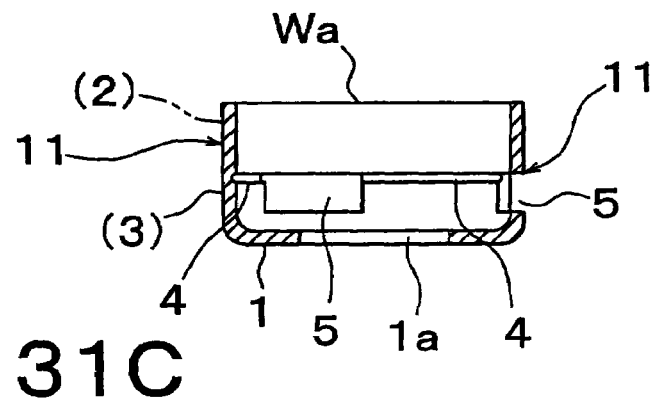
Figure 31C:
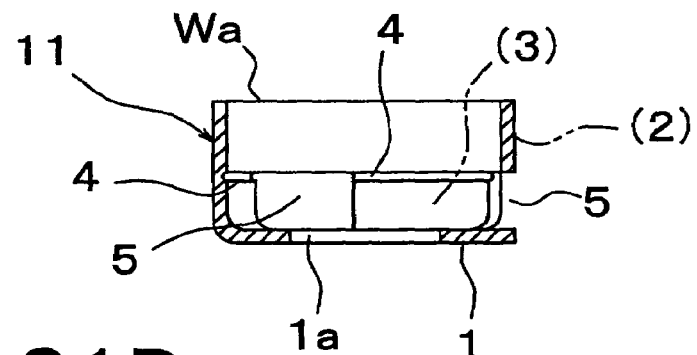
Figure 31D:
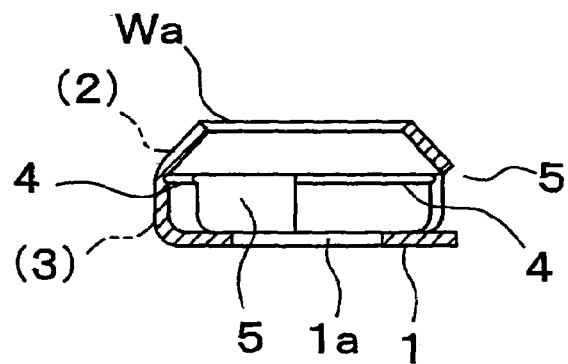

In the second embodiment, as shown in FIG. 31A, one of the through-holes 1a, through which a shaft (not shown) or a sun gear (not shown) is inserted, is first of all made at the center in one of pre-flanges (1) of the plate material W formed into a circular shape, and the plate material W is bent and drawn into the shape of a cup. Thereafter, as shown in FIG. 31B, the opening 5 is made in a lower portion (of the drawing) in the wall 11 of the cup-shaped material W. The groove 4 designed as a bending guide is formed in the inner periphery of the wall 11 of the material W on the border between the joint 3 and the other flange 2. Then, as shown in FIG. 31C, the outer peripheral portion of the flange 1 which faces the opening 5 is flattened. As shown in FIG. 31D, the material W is preliminarily closed off at an appropriate angle from the groove 4 so that the front-end opening of the wall (the outer peripheral end face Wa of the material W) is slightly shrunk radially inwardly by means of spinning or the like. Thereafter, as described above (see FIGS. 19, 20), the closing-off mandrels 12 are inserted from the openings 5 and the material W is pressed. The material W is then closed off so that the front-end opening in the wall 11 (the outer peripheral face Wa of the material W) is shrunk radially inwardly, until the pre-flange (2) becomes parallel to the flange 1. Thus, the integral-type carrier C is formed so that the joints 3 for connecting the opposed flanges 1, 2 continue therefrom.

Figure 32A:
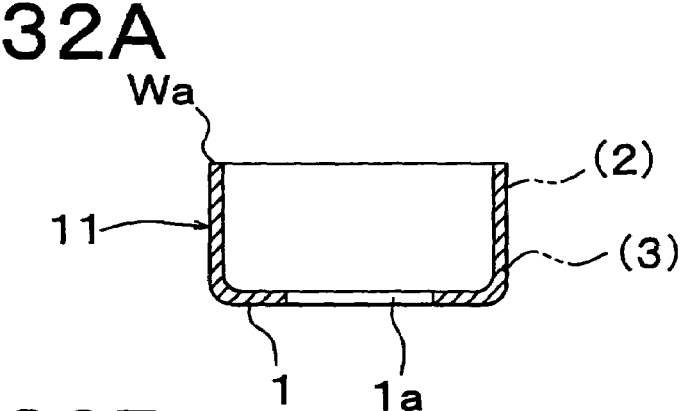
FIG. 32 is a cross-sectional view of a method of manufacturing a carrier according to a third embodiment of the invention.
Figure 32B:
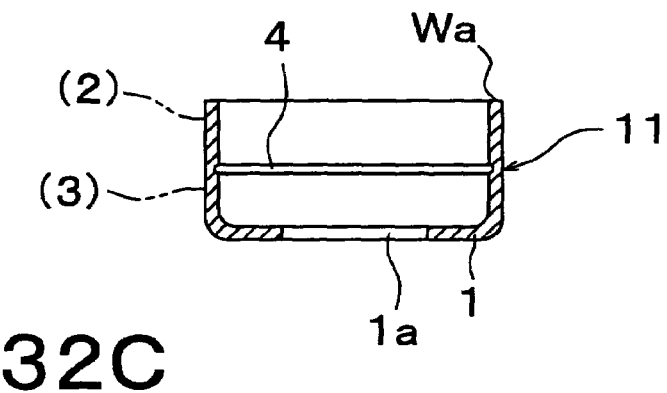
Figure 32C:
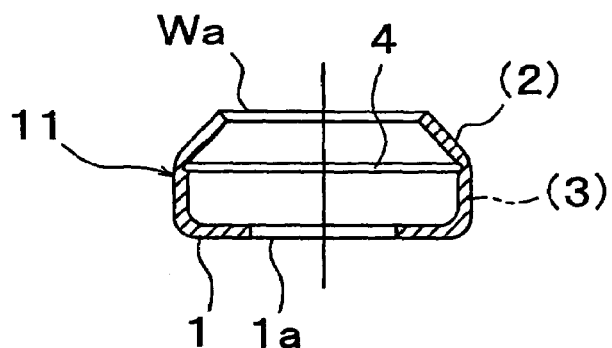
Figure 32D:
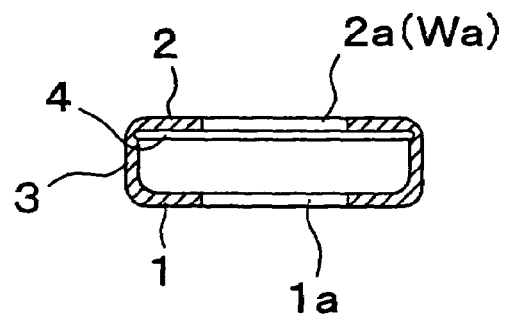

In the third embodiment, as is the case with the second embodiment, as shown in FIG. 32A, one of the through-holes 1a, through which a shaft (not shown) or a sun gear (not shown) is inserted, is first of all made at the center in one of pre-flanges (1) of the plate material W formed into a circular shape, and the plate material W is bent and drawn into the shape of a cup. Thereafter, as shown in FIG. 32B, the groove 4 designed as a bending guide is formed in the inner periphery of the wall 11 of the cup-shaped material W in a portion which is to be the border between the joints 3 and the flange 2. Then, as shown in FIG. 32C, the material W is preliminarily closed off at an appropriate angle from the groove 4 so that the front-end opening in the wall 11 is slightly shrunk radially inwardly by means of spinning or the like. Then, as shown in FIG. 32D, the material W is closed off so that the front-end opening in the wall 11 (the outer peripheral face Wa of the material W) is shrunk radially inwardly, and the integral-type carrier C is formed so that the joints 3 for connecting the opposed flanges 1, 2 continue therefrom. The openings 5 are thereafter made in the joints 3 (not shown).

Figure 33A:
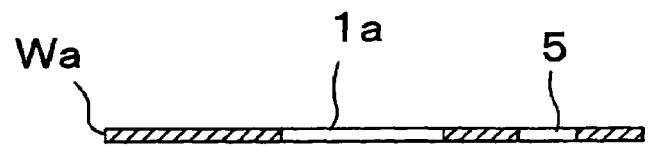
FIG. 33 is a cross-sectional view of a method of manufacturing a carrier according to a fourth embodiment of the invention.
Figure 33B:
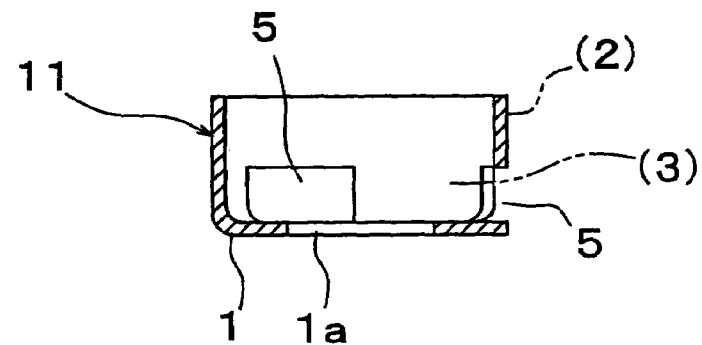
Figure 33C:
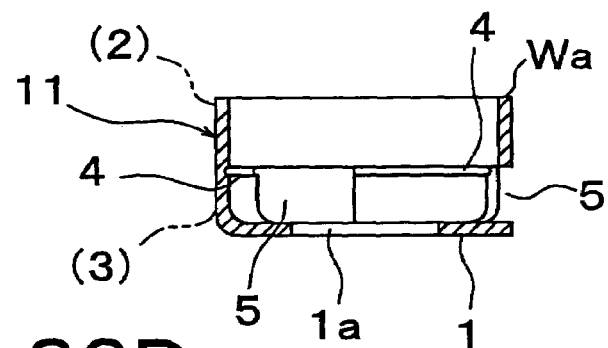
Figure 33D:
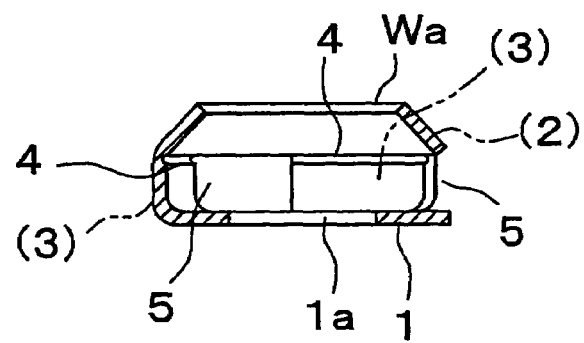

In the fourth embodiment, as shown in FIG. 33A, one of the through-holes 1a, through which a shaft (not shown) or a sun gear (not shown) is inserted, is first of all made at the center in one of pre-flanges (1) of the plate material W formed into the shape of a disc, and the openings 5 are made around the through-hole 1a. Thereafter, the plate material W is bent and drawn into the shape of a cup as shown in FIG. 33B, and the groove 4 designed as a bending guide is formed in the inner periphery of the wall 11 of the cup-shaped material W in a portion which is to be the border between the joints 3 and the flange 2. Then, as shown in FIG. 33D, the material W is preliminarily closed off at an appropriate angle from the groove 4 so that the front-end opening in the wall 11 is slightly shrunk radially inwardly by means of spinning or the like, and the material W is then closed off so that the front-end opening in the wall 11 (the outer peripheral end face Wa of the material W) is shrunk radially inwardly. Thus, the carrier C is integrally formed so that the joints 3 for connecting the opposed flanges 1, 2 continue therefrom, as in the aforementioned embodiments.

Then in the fifth embodiment, as is the case with the fourth embodiment, as shown in FIG. 34A, one of the through-holes 1a, through which a shaft (not shown) or a sun gear (not shown) is inserted, is first of all made at the center in one of pre-flanges (1) of the plate material W formed into the shape of a disc, and the openings 5 are made around the through-hole 1a. Then, as shown in FIG. 34B, the groove 4 designed as a bending guide is formed in the inner periphery of the wall 11 of the plate material W in a portion which is to be the border between the joints 3 and the flange 2. Then, as shown in FIG. 34C, the plate material W is bent from the groove 4 and drawn into the shape of a cup. That is, as long as the bending guide 4 of the invention is formed before the material W is closed off, the bending guide 4 may be formed before the plate material W is bent and drawn into the shape of a cup. In this embodiment, the wall 11 formed by bending and drawing the material W constitutes only the flange 2. Thereafter, as shown in FIG. 34D, while the border between the pre-flange (1) and the pre-joints (3) is being bent, the material W is closed off so that the front-end opening in the wall 11 (the outer peripheral end face Wa of the material W) is shrunk radially inwardly. Thereby the integral-type carrier C is formed so that the joints 3 for connecting the opposed flanges 1, 2 continue therefrom.

Figure 35A:
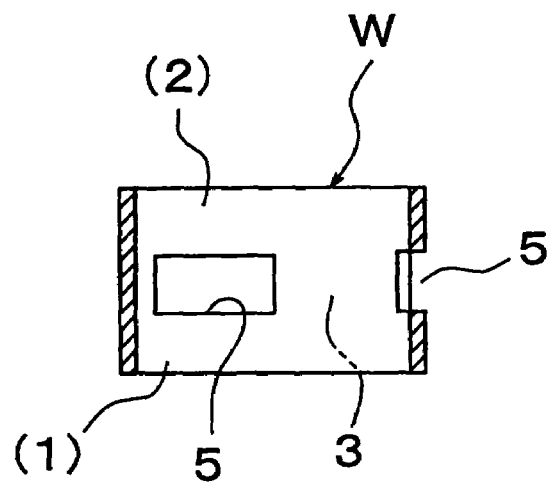
FIG. 35 is a cross-sectional view of a method of manufacturing a carrier according to a sixth embodiment of the invention.
Figure 35B:
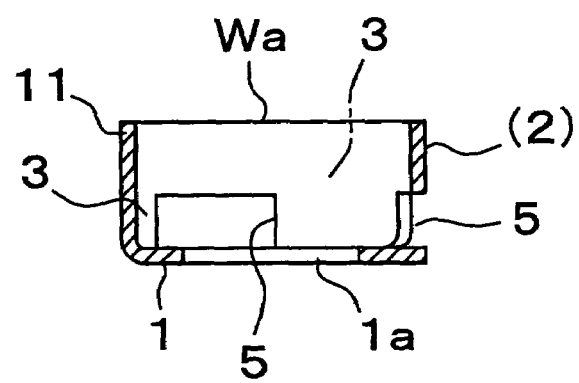
Figure 35C:
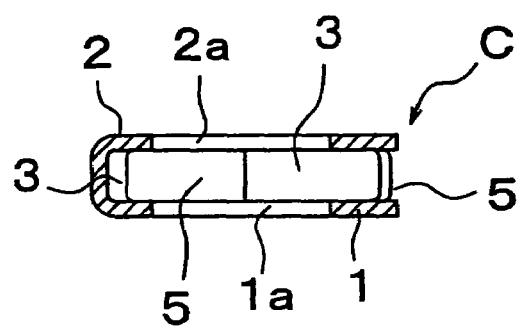

Unlike the aforementioned embodiments, a tubular material W is prepared in the sixth embodiment. In this embodiment, as shown in FIG. 35A, the openings 5 are first of all made at the axial centers in the tubular material W. Thereafter, the tubular material W is-formed into the shape of a cup by closing off one end thereof as shown in FIG. 35B. Furthermore, as shown in FIG. 35C, the other end Wa of the material W, which is a cup-shaped opening, is closed off, whereby the opposed flanges 1, 2 and the joints for connecting them are integrally formed. Before both the ends of the tubular material W are sequentially closed off, they are preliminarily closed off as described above. The openings 5 may not necessarily be made at the outset. Namely, the openings 5 may also be made after one or the other end of the tubular material W has been closed off. Although not shown in this embodiment, a groove designed as a bending guide is formed in the inner periphery of the material W in a portion which is to be the border between the joints 3 and the flange 2. The groove may also be formed in the inner periphery of the tubular material W in a portion which is to be the border between the flange 1 and the joints 3 before the material W is formed into the shape of a cup by closing off one end thereof to form the flange 1. As described above, the auxiliary holes 6', 7', which are to be the engagement holes 6, 7 for engagement with rotational shafts of planetary gears, may be made in advance in the tubular material W.

Figure 36A:
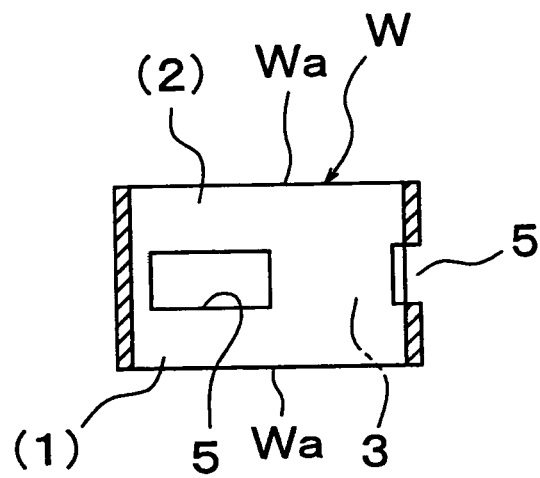
FIG. 36 is a cross-sectional view of a method of manufacturing a carrier according to a seventh embodiment of the invention.
Figure 36B:
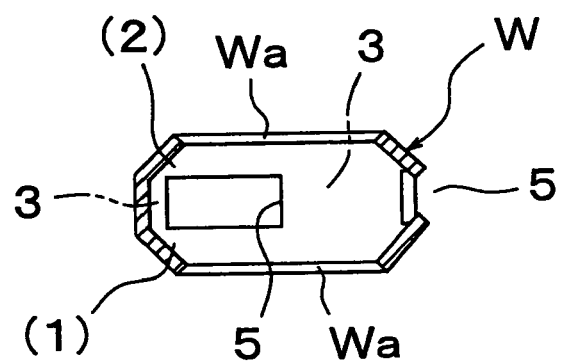
Figure 36C:
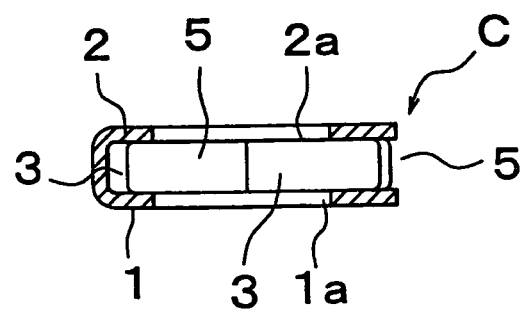

In the seventh embodiment, as is the case with the aforementioned sixth embodiment, the tubular material W with the openings 5 made in its axial centers is prepared as shown in FIG. 36A. The seventh embodiment is different from the sixth embodiment in that both the ends Wa of the tubular material W are closed off simultaneously. That is, as shown in FIG. 36B, both the ends Wa of the tubular material W are preliminarily closed off at the same time. Furthermore, as shown in FIG. 36C, both the ends Wa are closed off simultaneously, whereby the opposed flanges 1, 2 are formed. The axial centers of the tubular material W, which are not closed off, constitute the joints 3 for integrally connecting the flanges 1, 2.

Figure 37A:
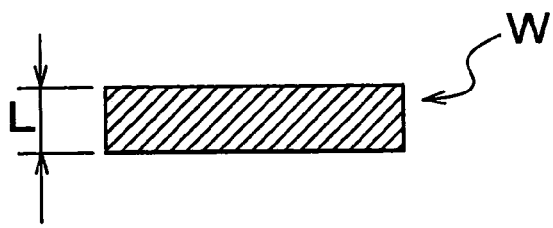
FIG. 37 is a cross-sectional view of a method of manufacturing a carrier according to an eighth embodiment of the invention.
Figure 37B:
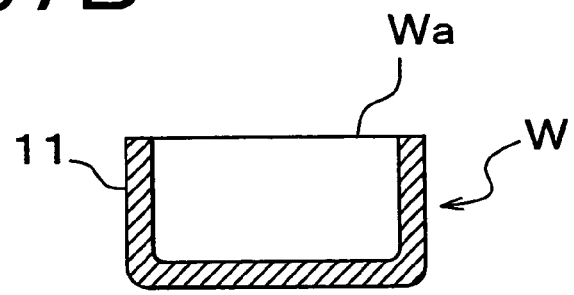
Figure 37C:
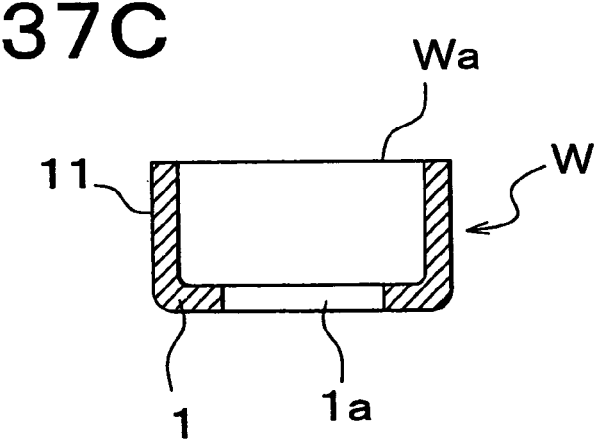
Figure 37D:
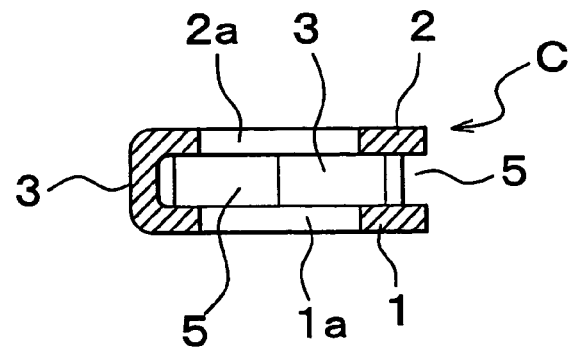
Figure 38:
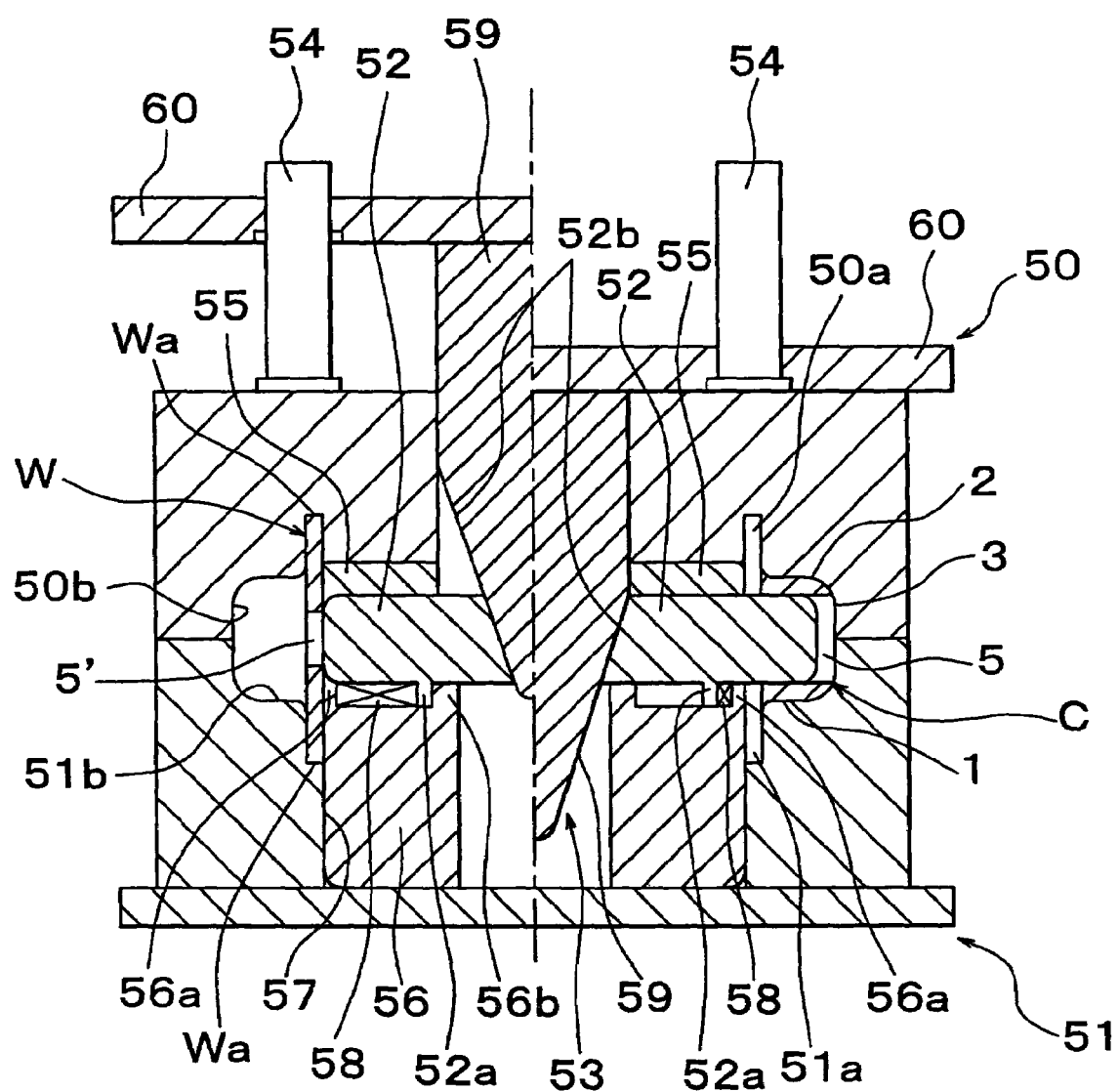
FIG. 38 is a cross-sectional view of a method of manufacturing a carrier according to a ninth embodiment of the invention.

Unlike the aforementioned embodiment, in the eighth embodiment, a rod material W is prepared as shown in FIG. 37A. "The rod material" means a material which has a predetermined length (predetermined thickness) L in the axial direction of the carrier so as to be formed into the shape of a cup by backward extrusion or the like and which is thicker than the aforementioned plate material. In this embodiment, as shown in FIG. 37B, the rod material W is first of all formed into the shape of a cup by backward extrusion or the like. Thereafter, as shown in FIG. 37C, one of the through-holes 1a, through which a shaft (not shown) or a sun gear (not shown) is inserted, is made in the bottom of the cup-shaped material W. The cup-shaped opening Wa is then closed off, whereby the opposed flanges 1, 2 and the joints 3 for connecting them are integrally formed as shown in FIG. 37D. The openings 5 among the joints 3 and the like can be made after the rod material W has been formed into the shape of a cup.

In the ninth embodiment, unlike all the aforementioned embodiments wherein the flange 2 or both the flanges 1, 2 are formed by closing off the material W, the joints 3 are formed by bulging the axial centers of the tubular material W radially outwardly, and accordingly, the flanges 1, 2 are integrally formed so as to be opposed to each other and extend from the joints 3 radially inwardly. FIG. 38 shows a mechanical bulging machine for bulging the tubular material. In FIG. 38, while the material has not been bulged on the left side with respect to a center line indicated by a chain line, the material has been bulged on the right side with respect to the center line.

The bulging machine according to one embodiment of the invention will be described with reference to FIG. 38. This bulging machine has an upper mold 50 and a lower mold 51 which are vertically movable relative to each other, punches 52 for pressing the tubular material W so as to bulge its axial centers, and a cam mechanism 53 for driving the punches 52 radially outwardly. In this embodiment, the upper mold 50 is supported by a vertical-drive rod 54 so that the upper mold 50 vertically moves relative to the lower mold 51. Receptacles 50a, 51a for receiving the tubular material W and cavities 50b, 51b for determining the configuration of the bulged material are formed in a butt face which is formed when the upper mold 50 and the lower mold 51 are closed. The punches 52 are divided in the radial direction of the material W and radially slidably supported by punch plates 55 disposed inwardly of the receptacle 50a of the upper mold 50. A punch holder 56 is disposed below the punches 52. A receptacle 57, which receives the punch holder 56 when the upper mold 50 and the lower mold 51 are butted against each other, is formed inwardly of the receptacle 51a of the lower mold 51. A stopper 52a protrudes from a radially intermediate position on the lower surface of each of the punches 52. Stoppers 56a, 56b are formed at radially inner and outer positions on the upper surface of the punch holder 56. A spring 58 is interposed between the stopper 52a of each of the punches 52 and the radially outer stopper 56a of the punch holder 56 so as to urge each of the punches 52 to retract radially inwardly. The cam mechanism 53 drives each of the punches 52 radially outwardly against the urging force of the spring 58 and is composed of a cam face 52b formed radially inwardly of each of the punches 52 and a cam member 59 bonded to the cam face 52b. The upper end of the cam member 59 is connected to a drive plate 60. The vertical-drive rod 54 is inserted through the drive plate 60 so as to vertically drive the drive plate 60 relative to the upper mold 50.

In the thus-constructed bulging machine, if the drive plate 60 is moved downwards with respect to the upper mold 50 from the state shown on the left side of FIG. 38, the axial centers of the tubular material W are pressed outwardly by the cam member 52 and bulged so as to follow the cavities 50b, 51b of the upper and lower molds 50, 51. Thus the joints 3 are formed. At the same time, both the axial ends of the tubular material W constitute a pair of the opposed flanges 1, 2. The through-holes 1a, 2a, through which shafts (not shown) and sun gears (not shown) are inserted, are defined by both the end faces Wa of the tubular material W. As can be seen from FIG. 35A and FIG. 36A, the holes 5', which are to be the openings 5, are made in advance in the axial centers of the tubular material W. In consideration of the fact that the holes 5' are enlarged radially and axially when the material W is bulged, the dimension of the holes 5' is set in accordance with the dimension of the openings 5. After the material W has been bulged, the drive plate 60 is moved upwards with respect to the upper mold 50, whereby the radial end of each of the punches 52 is displaced to a position inwardly of the through-hole 2a due to the urging force of the spring 58. Therefore, each of the punches 52 can move away from the carrier C through the through-hole 2a as the upper mold 50 ascends.

The invention is not limited to the aforementioned embodiments. It is possible to employ a hydraulic bulging machine (not shown) instead of the mechanical one. In this case, a working fluid is supplied into a tubular material at a predetermined pressure. Therefore, the tubular material is sealed to prevent the working fluid from leaking out from the holes which are made in advance in the axial centers of the tubular material and which are to be the openings 5. Alternatively, the holes which are to be the openings 5 are not made in advance in the tubular material, and the openings 5 are made in the material after it has been bulged.

What is claimed is:

1. A method of manufacturing a carrier having a pair of one-piece ring-shaped flanges and adapted to rotatably support rotating bodies between the one-piece ring-shaped flanges, comprising the steps of:

forming a material into the shape of a cup having an opening;

closing off the opening of the cup so that a pair of one-piece ring-shaped flanges opposed to each other and designed to rotatably support rotating bodies between the pair of one-piece ring-shaped flanges and joints connecting the pair of one-piece ring-shaped flanges are integrally formed; and wherein openings are made in pre-joints of the material before the material is closed off.

2. The method according to claim 1, wherein:
the material is selected from a plate material, a rod material and a tubular material.

3. The method according to claim 1, wherein:
a bending guide is formed on a border between pre-joints and pre-flanges before the material is closed off.

4. The method according to claim 3, wherein:
a groove is formed as the bending guide on a side of the border to which the flanges are opposed.

5. The method according to claim 1, wherein:
mandrels are inserted from the openings made in the pre-joints of the material so as to close off the material.

6. The method according to claim 1, wherein:
engagement holes for engagement with rotational shafts for rotatably supporting rotating bodies in the carrier are made in pre-flanges before the material is closed off.

7. The method according to claim 1, wherein:
mandrels are interposed in positions for mounting rotating bodies between the flanges so that the flanges are swaged towards the mandrels.

8. The method according to claim 1, wherein:
openings are made in the joints of the material after the material has been closed off.

9. The method according to claim 1, wherein:
the material is selected from a plate material and a tubular material; and
openings are made in the pre-joints of the material before the material is formed into the shape of a cup.

10. The method according to claim 1, wherein:
the material is selected from a plate material and a tubular material; and
a bending guide is formed on a border between pre-joints and a pre-flange of the material before the material is formed into the shape of a cup.

11. The method according to claim 10, wherein:
a groove is formed as the bending guide on a side of the border to which the flanges are opposed.

12. The method according to claim 1, wherein:
a bottom of the material formed into the shape of the cup is turned into a first flange;
peripheral walls adjacent to the bottom are turned into joints; and
an opening-side portion of the cup-shaped material, which is to be closed off, is turned into a second flange.

13. The method according to claim 1, wherein the joints connecting the one-piece ring-shaped flanges are curved in a circumferential direction of the carrier.

14. A method of manufacturing a carrier having a pair of flanges and adapted to rotatably support rotating bodies between the flanges, comprising the steps of:
preparing a tubular material;
closing off both end openings of the tubular material so that a pair of flanges opposed to each other and designed to rotatably support rotating bodies between the flanges and joints connecting the flanges are integrally formed; and wherein openings are made in pre-joints of the material before the material is closed off.

15. The method according to claim 14, wherein:
a bending guide is formed on a border between pre-joints and pre-flanges before the material is closed off.

16. The method according to claim 15, wherein:
a groove is formed as the bending guide inside the tube on the border.

17. The method according to claim 14, wherein:
mandrels are inserted from the openings made in the pre-joints of the material so as to close off the material.

18. The method according to claim 14, wherein:
engagement holes for engagement with rotational shafts for rotatably supporting rotating bodies in the carrier are made in pre-flanges before the material is closed off.

19. The method according to claim 14, wherein:
mandrels are interposed in positions for mounting rotating bodies between the flanges so that the flanges are swaged towards the mandrels.

20. The method according to claim 14, wherein:
axial centers of a side wall of the tubular material are turned into the joints; and
both axial ends of the side wall of the tubular material, which are to be closed off, are turned into a pair of flanges.

21. The method according to claim 14, wherein each of the flanges is a one-piece ring-shaped flange which lies in a plane.

22. The method according to claim 14, wherein the joints connecting the flanges are curved in a circumferential direction of the carrier.

23. A method of manufacturing a carrier having a pair of flanges and adapted to rotatably support rotating bodies between the flanges, comprising the steps of:
preparing a tubular material having a tubular wall surface;
bulging a wall surface at the axial center of the tubular material radially outwardly so that a pair of flanges opposed to each other and designed to rotatably support rotating bodies between the flanges and joints connecting the flanges are integrally formed; and wherein
openings are made in pre-joints of the material before the material is closed off.

24. The method according to claim 23, wherein:
engagement holes for engagement with rotational shafts for rotatably supporting rotating bodies in the carrier are made in pre-flanges before the material is closed off.

25. The method according to claim 23, wherein:
mandrels are interposed in positions for mounting rotating bodies between the flanges so that the flanges are swaged towards the mandrels.

26. The method according to claim 23, wherein:
axial centers of the bulged side wall are turned into the joints; and
both axial ends of the side wall of the tubular material, which are to be closed off, are turned into a pair of flanges.

27. The method according to claim 23, wherein each of the flanges is a one-piece ring-shaped flange which lies in a plane.

28. The method according to claim 23, wherein the joints connecting the flanges are curved in a circumferential direction of the carrier.

29. A method of manufacturing a carrier having a pair of flanges and adapted to rotatably support rotating bodies between the flanges, comprising the steps of:
preparing a tubular material;
closing off both end openings of the tubular material so that a pair of flanges opposed to each other and designed to rotatably support rotating bodies between the flanges and joints connecting the flanges are integrally formed; and
wherein engagement holes for engagement with rotational shafts for rotatably supporting rotating bodies in the carrier are made in pre-flanges before the material is closed off.

30. The method according to claim 29, wherein:
a bending guide is formed on a border between pre-joints and pre-flanges before the material is closed off.

31. The method according to claim 30, wherein:
a groove is formed as the bending guide inside the tube on the border.

32. The method according to claim 29, wherein:
mandrels are inserted from the openings made in the pre-joints of the material so as to close off the material.

33. The method according to claim 29, wherein:
mandrels are interposed in positions for mounting rotating bodies between the flanges so that the flanges are swaged towards the mandrels.

34. The method according to claim 29, wherein:
axial centers of a side wall of the tubular material are turned into the joints; and
both axial ends of the side wall of the tubular material, which are to be closed off, are turned into a pair of flanges.

35. The method according to claim 29, wherein each of the flanges is a one-piece ring-shaped flange which lies in a plane.

36. The method according to claim 29, wherein the joints connecting the flanges are curved in a circumferential direction of the carrier.

37. A method of manufacturing a carrier having a pair of flanges and adapted to rotatably support rotating bodies between the flanges, comprising the steps of:
preparing a tubular material having a tubular wall surface;
bulging a wall surface at the axial center of the tubular material radially outwardly so that a pair of flanges opposed to each other and designed to rotatably support rotating bodies between the flanges and joints connecting the flanges are integrally formed; and wherein
engagement holes for engagement with rotational shafts for rotatably supporting rotating bodies in the carrier are made in pre-flanges before the material is closed off.

38. The method according to claim 37, wherein:
mandrels are interposed in positions for mounting rotating bodies between the flanges so that the flanges are swaged towards the mandrels.

39. The method according to claim 37, wherein:
axial centers of the bulged side wall are turned into the joints; and
both axial ends of the side wall of the tubular material, which are to be closed off, are turned into a pair of flanges.

40. The method according to claim 37, wherein each of the flanges is a one-piece ring-shaped flange which lies in a plane.

41. The method according to claim 37, wherein the joints connecting the flanges are curved in a circumferential direction of the carrier.

* * * * *